(12) United States Patent
You et al.

(10) Patent No.: US 12,089,251 B2
(45) Date of Patent: Sep. 10, 2024

(54) TRANSMISSION METHOD AND COMMUNICATIONS APPARATUS

(71) Applicant: HUAWEI TECHNOLOGIES CO., LTD., Guangdong (CN)

(72) Inventors: Chunhua You, Shanghai (CN); Qufang Huang, Shenzhen (CN); Yinghao Guo, Shanghai (CN); Chong Lou, Shanghai (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 367 days.

(21) Appl. No.: 17/403,649

(22) Filed: Aug. 16, 2021

(65) Prior Publication Data

US 2021/0378007 A1 Dec. 2, 2021

Related U.S. Application Data

(63) Continuation of application No. PCT/CN2020/075331, filed on Feb. 14, 2020.

(30) Foreign Application Priority Data

Feb. 15, 2019 (CN) .......................... 201910118182.5

(51) Int. Cl.
*H04W 74/00* (2009.01)
*H04L 1/1812* (2023.01)
(Continued)

(52) U.S. Cl.
CPC ......... *H04W 74/006* (2013.01); *H04L 1/1819* (2013.01); *H04L 1/1896* (2013.01);
(Continued)

(58) Field of Classification Search
CPC . H04W 76/28; H04W 72/23; H04W 72/0446; H04W 24/10; H04W 76/27
See application file for complete search history.

(56) References Cited

U.S. PATENT DOCUMENTS

| 9,929,839 B2 | 3/2018 | Liu et al. |
| 10,177,875 B2 | 1/2019 | Dinan |
| 2021/0314102 A1* | 10/2021 | Li ........................ H04L 1/1896 |

FOREIGN PATENT DOCUMENTS

| CN | 102158976 A | 8/2011 |
| CN | 103873212 A | 6/2014 |

(Continued)

OTHER PUBLICATIONS

Qualcomm Incorporated, On performance requirements for Rel-14 eLAA [online], 3GPP TSG RAN WG4 #81 R4-1609708, Internet URL: http://www.3gpp.org/ftp/tsg_ran/WG4_Radio/TSGR4_81/Docs/R4-1609708.zip>, Nov. 4, 2016.

(Continued)

*Primary Examiner* — Khalid W Shaheed
(74) *Attorney, Agent, or Firm* — HUAWEI TECHNOLOGIES CO., LTD.

(57) ABSTRACT

This application provides a transmission method and a communications apparatus, to simplify LBT behavior before a terminal device can transmit a HARQ feedback, and reduce implementation complexity. The method includes: receiving first DCI, where the first DCI is used to indicate or activate a downlink transmission resource; receiving downlink data on the downlink transmission resource; receiving second DCI, where the second DCI is used to indicate an uplink transmission resource, and the uplink transmission resource is used to transmit feedback information for the downlink data; and sending the feedback information on the uplink transmission resource.

20 Claims, 5 Drawing Sheets

(51) Int. Cl.
 *H04L 1/1867* (2023.01)
 *H04W 72/0446* (2023.01)
 *H04W 74/0816* (2024.01)
 *H04W 76/28* (2018.01)

(52) U.S. Cl.
 CPC ... *H04W 72/0446* (2013.01); *H04W 74/0816* (2013.01); *H04W 76/28* (2018.02)

(56) References Cited

FOREIGN PATENT DOCUMENTS

| | | |
|---|---|---|
| CN | 104243108 A | 12/2014 |
| CN | 105634689 A | 6/2016 |
| CN | 107332646 A | 11/2017 |
| CN | 107347002 A | 11/2017 |
| CN | 108353417 A | 7/2018 |
| CN | 108633016 A | 10/2018 |
| CN | 109417444 A | 3/2019 |
| EP | 3079436 A1 | 10/2016 |
| RU | 2604830 C1 | 12/2016 |
| WO | 2014000214 A1 | 1/2014 |
| WO | 2015113612 A1 | 8/2015 |
| WO | 2016122113 A1 | 8/2016 |
| WO | 2017083388 A1 | 5/2017 |
| WO | 2018117248 A1 | 6/2018 |
| WO | 2019028917 A1 | 2/2019 |

OTHER PUBLICATIONS

Chen Fatang:"Analysis and design of uplink resource scheduling in narrow band Internet of things",2018.total 6 pages.
R1-1814146, Huawei et al, Feature lead summary of HARQ enhancement in NR-U, 3GPP TSG RAN WG1 Meeting #95, Spokane, USA, Nov. 12-16, 2018, total 15 pages.
CATT, Discussion on the DRX Timers. 3GPP TSG-RAN WG2 #99bis, Prague, Czech Republic, Oct. 9-13, 2017, R2-1710303, 4 pages.
3GPP TS 38.321 V15.4.0:"3rd Generation Partnership Project; Technical Specification Group Radio Access Network; NR; Medium Access Control (MAC) protocol specification (Release 15)",Dec. 2018, total 77 pages.
Fujitsu, HARQ enhancements for NR-U. 3GPP TSG RAN WG1 Meeting #95, Spokane, USA, November 12-16, 2018, R1-1812406, 4 pages.
3GPP TS 38.213 V15.4.0:"3rd Generation Partnership Project; Technical Specification Group Radio Access Network; NR;Physical layer procedures for control(Release 15)",Dec. 2018,total 104 pages.
3GPP TS 38.331 V15.4.0 (Dec. 2018), 3rd Generation Partnership Project; Technical Specification Group Radio Access Network;NR; Radio Resource Control (RRC) protocol specification(Release 15), 474 pages.
R1-1900955 3GPP TSG RAN WG1 Ad-Hoc Meeting 1901 Taipei, Jan. 21-25, 2019 Source:NTT DOCOMO, Inc. Title: HARQ enhancement for NR-U Agenda Item:7.2.2.2.3 Document for: Discussion and Decision total 7 pages.

* cited by examiner

TRANSMISSION METHOD AND COMMUNICATIONS APPARATUS

CROSS-REFERENCE TO RELATED APPLICATIONS

This application is a continuation of International Application No. PCT/CN2020/075331, filed on Feb. 14, 2020, which claims priority to Chinese Patent Application No. 201910118182.5, filed on Feb. 15, 2019. The disclosures of the aforementioned applications are herein incorporated by reference in their entireties.

TECHNICAL FIELD

This application relates to the communications field, and more specifically, to a transmission method and a communications apparatus.

BACKGROUND

A wireless communications system may transmit data on an unlicensed frequency band to improve spectrum utilization. Before transmitting data, a communications device, for example, a terminal device or a network device, needs to complete a channel access (or listen before talk (LBT)) process to access a channel. The channel access process includes a fixed-duration-based channel access process and a fallback-based channel access process. Only after completing the channel access process, the communications device can use the channel in a period of time. The period of time is referred to as a channel occupancy time (COT).

In the prior art, before transmitting a hybrid automatic repeat request (HARQ) feedback for downlink data in an unlicensed cell, a terminal device needs to perform a fallback-based channel access process to obtain a channel, to transmit the HARQ feedback for the downlink data. The process is relatively complex to implement.

SUMMARY

This application provides a transmission method and a communications apparatus, to simplify LBT behavior before a terminal device transmit a HARQ feedback, and reduce implementation complexity.

According to a first aspect, a transmission method is provided. The method may be performed by a terminal device, or may be performed by a chip configured in a terminal device.

The method includes: receiving first downlink control information (DCI), where the first DCI is used to indicate or activate a downlink transmission resource; receiving downlink data on the downlink transmission resource; receiving second DCI, where the second DCI is used to indicate an uplink transmission resource, and the uplink transmission resource is used to transmit feedback information for the downlink data; and sending the feedback information on the uplink transmission resource.

According to the transmission method provided in this application, a network device first configures a dynamically scheduled downlink transmission resource or activates a semi-persistently scheduled downlink transmission resource by using the first DCI. Then, the network device sends the second DCI to the terminal device after completing a channel access process, to indicate the uplink transmission resource used to transmit a HARQ feedback for the downlink data. Compared with that in the prior art, the network device indicates to allocate resources based on two pieces of DCI. When allocating the resources, the network device performs listen before talk (LBT) (or referred to as monitor before transmit). It is equivalent to that the network device shares with the terminal device, a COT corresponding to the uplink transmission resource. The terminal device obtains the resources in two batches, and shares an LBT effect of the network device. In this way, the terminal device is allowed to perform a first-type channel access process or the terminal device is allowed not to perform the channel access process. Therefore, the terminal device may send the feedback information on the uplink resource without performing a second-type channel access process, to simplify behavior of the terminal device, and reduce implementation complexity.

The first-type channel access process may also be referred to as a fixed-duration-based channel access process. The second-type channel access process may also be referred to as a fallback-based channel access process. For details, refer to descriptions in specific embodiments. Details are not described herein.

With reference to the first aspect, in some implementations of the first aspect, the first DCI may further include a HARQ process identifier (ID).

The first DCI carries the HARQ process ID, and the terminal device may perform the HARQ feedback based on the HARQ process ID.

With reference to the first aspect, in some implementations of the first aspect, the receiving second DCI includes: monitoring a downlink control channel in a target time period to obtain the second DCI, where a discontinuous reception (DRX) activation time includes the target time period, or a discontinuous reception DRX activation time does not include the target time period.

If the DRX activation time includes the target time period, the terminal device monitors physical downlink control channels (PDCCH) of all activated serving cells in the target time period. If the DRX activation time does not include the target time period, the terminal device monitors a PDCCH of a specific activated serving cell in the target time period, namely, a PDCCH of a serving cell in which the second DCI can be transmitted. Compared with a case in which the terminal device monitors the PDCCHs of all the activated serving cells in the target time period, implementation of the terminal device in this case is simpler.

With reference to the first aspect, in some implementations of the first aspect, a start time of the target time period is determined based on an end location of the first DCI or an end location of the downlink data, or a start time of the target time period is configured by a network device.

With reference to the first aspect, in some implementations of the first aspect, an end time of the target time period is a time at which the second DCI is received, or an end time of the target time period is configured by the network device.

With reference to the first aspect, in some implementations of the first aspect, the first DCI includes time range indication information, the time range indication information is used to indicate a time range, and the time range is a time range in which a terminal device expects to receive the second DCI.

Based on the foregoing technical solution, the terminal device may monitor the second DCI only in the time range in which the second DCI is expected to be received, and does not need to monitor the second DCI all the time. This can reduce power consumption.

With reference to the first aspect, in some implementations of the first aspect, the second DCI is used to indicate that a type of a channel access process of the terminal device is a first type, or the second DCI is used to indicate the terminal device not to perform a channel access process.

Based on the foregoing technical solution, when the second DCI is received, the terminal device may perform the first-type channel access process. After the first-type channel access process is completed, the terminal device may send the feedback information by using the uplink transmission resource. Alternatively, when the second DCI is received, the terminal device may send the feedback information by using the uplink transmission resource without performing the first-type channel access process. Therefore, the terminal device may not perform the second-type channel access process. This simplifies the behavior of the terminal device, and reduces the implementation complexity.

With reference to the first aspect, in some implementations of the first aspect, the downlink transmission resource and the uplink transmission resource belong to different channel occupancy time COT in time domain.

With reference to the first aspect, in some implementations of the first aspect, the second DCI further includes at least one of the following:

(1) ID information of the terminal device

The network device may indicate, by using the ID information of the terminal device, in the second DCI, a terminal device to which the second DCI is specific. The second DCI may not include the ID information of the terminal device, and the second DCI may be broadcast or multicast.

(2) ID information of a first serving cell. The first serving cell is a cell corresponding to the downlink transmission resource on which the first DCI is carried.

The second DCI may carry the ID information of the first serving cell, to indicate that the uplink transmission resource indicated by using the second DCI is used to transmit a HARQ feedback for a downlink transmission resource on a cell. If the second DCI does not include the ID information of the first serving cell, the terminal device may determine, based on a cell corresponding to a resource for transmitting the second DCI, namely, a third serving cell, that the second DCI is first DCI of a cell.

(3) ID information of a second serving cell. The uplink transmission resource indicated by the second DCI is located in the second serving cell.

The second DCI carries the ID information of the second serving cell, to indicate the terminal device that a serving cell in which the uplink transmission resource is located is in a serving cell. If the second DCI does not include the ID information of the second serving cell, it may be considered that the second serving cell and the downlink transmission resource correspond to a same serving cell.

(4) ID information of a HARQ process

The HARQ process is a HARQ process corresponding to the second DCI. In other words, the uplink transmission resource indicated by the second DCI is used to perform HARQ feedbacks for HARQ processes.

If the second DCI does not include the ID information of the HARQ process, the HARQ process corresponding to the second DCI may be determined in other three manners.

Manner 1: The network device sends configuration information to the terminal device. The configuration information is used to indicate HARQ processes corresponding to the HARQ feedback performed by the terminal device on the uplink transmission resource indicated by the second DCI. In other words, the network device preconfigures IDs of these HARQ processes. The terminal device sends, to the network device by using the uplink transmission resource configured by using the second DCI, HARQ feedbacks of HARQ processes corresponding to the IDs of these HARQ processes.

Manner 2: HARQ processes corresponding to the second DCI are all HARQ processes. In other words, after receiving the second DCI, the terminal device sends feedback information for all the HARQ processes to the network device. It should be understood that the downlink data scheduled by using the first DCI may correspond to one or more of all the HARQ processes.

Manner 3: The network device configures a maximum quantity of HARQ processes that can be fed back. The terminal device notifies the network device of a HARQ process or HARQ processes for which feedback information is specific.

(5) ID information of an uplink bandwidth part, BWP. The uplink BWP is a BWP to which the uplink transmission resource belongs.

In other words, an ID of the uplink BWP indicates a BWP on which the uplink transmission resource configured by using the second DCI is located. If the uplink BWP indicated by the second DCI is not a currently activated uplink BWP, the terminal device performs an uplink BWP switching process, to switch from the activated uplink BWP to an indicated uplink BWP. If the second DCI does not include the ID information of the uplink BWP, the uplink transmission resource configured by using the second DCI is on a currently activated UL BWP.

(6) ID information of a subband (subband). The subband is a subband to which the uplink transmission resource belongs.

In other words, an ID of the subband is used to indicate a subband on which the uplink transmission resource is located. The terminal device sends the feedback information to the network device on the indicated subband.

If the second DCI does not include the ID information of the subband, it may be considered that the uplink transmission resource and the downlink transmission resource correspond to a same subband.

In conclusion, the second DCI may include one or more of (1) to (6), or the second DCI may not include any one of (1) to (6).

With reference to the first aspect, in some implementations of the first aspect, a cyclic redundancy check (CRC) of the first DCI is scrambled by using a first radio network temporary identifier (RNTI), a CRC of the second DCI is scrambled by using a second RNTI, and the first RNTI is the same as or different from the second RNTI.

For example, if the first RNTI is the same as the second RNTI, each of the first DCI and the second DCI may include an indicator bit. The indicator bit is used to distinguish between the first DCI and the second DCI.

With reference to the first aspect, in some implementations of the first aspect, the first serving cell in which the first DCI is transmitted corresponds to a third serving cell, and the receiving second DCI includes: monitoring a downlink control channel in the third serving cell to obtain the second DCI.

Further, a correspondence between the first serving cell and the third serving cell is configured for the terminal device by the network device, or a correspondence between the first serving cell and the third serving cell is preset.

Based on the foregoing technical solution, the terminal device may determine the third serving cell based on the correspondence between the first serving cell and the third serving cell, and then monitor the downlink control channel in the third serving cell to obtain the second DCI.

With reference to the first aspect, in some implementations of the first aspect, the method may include: when there is no running random access process or a running random access process is completed, starting or restarting a bandwidth part BWP inactivity timer (bwp-inactivitytimer); and/ or starting or restarting a secondary cell deactivation timer (scell-deactivationtimer), where the BWP inactivity timer is used for BWP switching, and the secondary cell deactivation timer is used for secondary cell deactivating.

The BWP inactivity timer is started or restarted, a BWP activation time may be prolonged, and the BWP can be used for data transmission. The secondary cell deactivation timer is started or restarted, a secondary cell (SCell) deactivation time may be prolonged, and the SCell may be used for data transmission.

According to a second aspect, a transmission method is provided. The method may be performed by a network device, or may be performed by a chip configured in a network device.

The method includes: sending first DCI, where the first DCI is used to indicate or activate a downlink transmission resource; sending downlink data on the downlink transmission resource; sending second DCI, where the second DCI is used to indicate an uplink transmission resource, and the uplink transmission resource is used to transmit feedback information for the downlink data; and receiving the feedback information on the uplink transmission resource.

According to the transmission method provided in this application, the network device first configures a dynamically scheduled downlink transmission resource or activates a semi-persistently scheduled downlink transmission resource by using the first DCI. Then, the network device sends the second DCI to a terminal device after completing a channel access process, to indicate the uplink transmission resource used to transmit a HARQ feedback for the downlink data. Compared with that in the prior art, the network device indicates to allocate resources based on two pieces of DCI. When allocating the resources, the network device performs listen before talk (LBT) (or referred to as monitor before transmit). It is equivalent to that the network device shares with the terminal device, a COT corresponding to the uplink transmission resource. The terminal device obtains the resources in two batches, and shares an LBT effect of the network device. In this way, the terminal device is allowed to perform a first-type channel access process or the terminal device is allowed not to perform the channel access process. Therefore, the terminal device may send the feedback information on the uplink resource without performing a second-type channel access process, to simplify behavior of the terminal device, and reduce implementation complexity.

With reference to the second aspect, in some implementations of the second aspect, the first DCI includes time range indication information, the time range indication information is used to indicate a time range, and the time range is a time range in which a terminal device expects to receive the second DCI.

With reference to the second aspect, in some implementations of the second aspect, the second DCI is used to indicate that a type of a channel access process of the terminal device is a first type, or the second DCI is used to indicate the terminal device not to perform a channel access process.

With reference to the second aspect, in some implementations of the second aspect, the downlink transmission resource and the uplink transmission resource belong to different channel occupancy time COT in time domain.

With reference to the second aspect, in some implementations of the second aspect, the second DCI further includes at least one of the following:
 ID information of the terminal device;
 ID information of a first serving cell, where the first serving cell is a cell corresponding to the downlink transmission resource on which the first DCI is carried;
 ID information of a second serving cell, where the uplink transmission resource is located in the second serving cell;
 ID information of a hybrid automatic repeat request HARQ process, where the HARQ process is a HARQ process corresponding to the second DCI;
 ID information of an uplink bandwidth part BWP, where the uplink BWP is a BWP to which the uplink transmission resource belongs; and
 ID information of a subband, where the subband is a subband to which the uplink transmission resource belongs.

With reference to the second aspect, in some implementations of the second aspect, a cyclic redundancy check CRC of the first DCI is scrambled by using a first radio network temporary identifier RNTI, a CRC of the second DCI is scrambled by using a second RNTI, and the first RNTI is the same as or different from the second RNTI.

With reference to the second aspect, in some implementations of the second aspect, the first RNTI is the same as the second RNTI, each of the first DCI and the second DCI includes an indicator bit, and the indicator bit is used to distinguish between the first DCI and the second DCI.

With reference to the second aspect, in some implementations of the second aspect, the first serving cell in which the first DCI is transmitted corresponds to a third serving cell, and the third serving cell is a cell in which the second DCI is located.

With reference to the second aspect, in some implementations of the second aspect, a correspondence between the first serving cell and the third serving cell is configured for the terminal device by the network device, or a correspondence between the first serving cell and the third serving cell is preset.

According to a third aspect, this application provides a communications apparatus. The communications apparatus has a function of implementing behavior of the terminal device in any aspect of the foregoing methods, and includes units or means (means) corresponding to steps or functions described in the method in the first aspect. The steps or the functions may be implemented by using software, hardware, or a combination of hardware and software.

According to a fourth aspect, this application provides a communications apparatus. The communications apparatus has a function of implementing behavior of the network device in any aspect of the foregoing methods, and includes units or means (means) corresponding to steps or functions described in the method in the second aspect. The steps or the functions may be implemented by using software, hardware, or a combination of hardware and software.

According to a fifth aspect, this application provides a communications apparatus, including a processor. The processor is configured to be connected to a memory, and read and execute a program stored in the memory, to implement the method provided in the first aspect.

Optionally, there are one or more processors and one or more memories.

Optionally, the memory may be integrated with the processor, or the memory and the processor are separately disposed.

In a specific implementation process, the memory may be a non-transitory (non-transitory) memory, for example, a read-only memory (ROM). The memory and the processor may be integrated on a same chip, or may be separately disposed on different chips. A type of the memory and a manner for disposing the memory and the processor are not limited in this embodiment of this application.

It should be understood that a related data exchange process, for example, sending of configuration information, may be a process of outputting indication information from the processor, and receiving of capability information, may be a process of receiving input capability information by the processor. Specifically, data output by the processor may be output to a transmitter, and input data received by the processor may be from a receiver. The transmitter and the receiver may be collectively referred to as a transceiver.

The apparatus according to the fifth aspect may be a chip. The processor may be implemented by using hardware or software. When the processor is implemented by using hardware, the processor may be a logic circuit, an integrated circuit, or the like. When the processor is implemented by using software. The processor may be a general-purpose processor, and is implemented by reading software code stored in the memory. The memory may be integrated into the processor, or may exist independently outside the processor.

According to a sixth aspect, this application provides a communications apparatus, including a processor. The processor is configured to be connected to a memory, and read and execute a program stored in the memory, to implement the method provided in the second aspect.

Optionally, there are one or more processors and one or more memories.

Optionally, the memory may be integrated with the processor, or the memory and the processor are separately disposed.

In a specific implementation process, the memory may be a non-transitory (non-transitory) memory, for example, a read-only memory (ROM). The memory and the processor may be integrated on a same chip, or may be separately disposed on different chips. A type of the memory and a manner for disposing the memory and the processor are not limited in this embodiment of this application.

It should be understood that a related data exchange process, for example, sending of configuration information, may be a process of outputting indication information from the processor, and receiving of capability information, may be a process of receiving input capability information by the processor. Specifically, data output by the processor may be output to a transmitter, and input data received by the processor may be from a receiver. The transmitter and the receiver may be collectively referred to as a transceiver.

The apparatus according to the sixth aspect may be a chip. The processor may be implemented by using hardware or software. When the processor is implemented by using hardware, the processor may be a logic circuit, an integrated circuit, or the like. When the processor is implemented by using software. The processor may be a general-purpose processor, and is implemented by reading software code stored in the memory. The memory may be integrated into the processor, or may exist independently outside the processor.

According to a seventh aspect, this application provides a communications apparatus, including a processor and an interface circuit. The processor is configured to communicate with another apparatus through the interface circuit, and perform the method provided in the first aspect.

Optionally, there are one or more processors and one or more memories.

According to an eighth aspect, this application provides a communications apparatus, including a processor and an interface circuit. The processor is configured to communicate with another apparatus through the interface circuit, and perform the method provided in the second aspect.

Optionally, there are one or more processors and one or more memories.

According to a ninth aspect, this application provides a program. When the program is executed by a processor, the program is used to perform the method according to the first aspect or the second aspect.

According to a tenth aspect, this application provides a program product, for example, a computer-readable storage medium, including the program in the ninth aspect.

Based on the foregoing technical solutions, the network device indicates to allocate the resources based on the two pieces of DCI. When allocating the resources, the network device performs the LBT. It is equivalent to that the network device shares with the terminal device, the COT corresponding to the uplink transmission resource. The terminal device obtains the resources in two batches, and shares the LBT effect of the network device. In this way, the terminal device is allowed to perform the first-type channel access process or the terminal device is allowed not to perform the channel access process. Therefore, the terminal may send the feedback information on the uplink resource without performing the second-type channel access process, to simplify the behavior of the terminal device, and reduce the implementation complexity. In addition, because the uplink transmission resource can be flexibly allocated by using the second DCI, the network device can flexibly schedule the uplink resource and the downlink resource. This improves resource utilization.

DESCRIPTION OF EMBODIMENTS

The following describes technical solutions of this application with reference to accompanying drawings.

The technical solutions of embodiments of this application may be applicable to various communications systems, such as but not limited to a narrowband internet of things (NB-IoT) system, a global system for mobile communications (GSM), a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunications system (UMTS), a worldwide interoperability for microwave access (WiMAX) communications system, a 5th generation (5G) system, or a new radio (NR).

Figure 1:
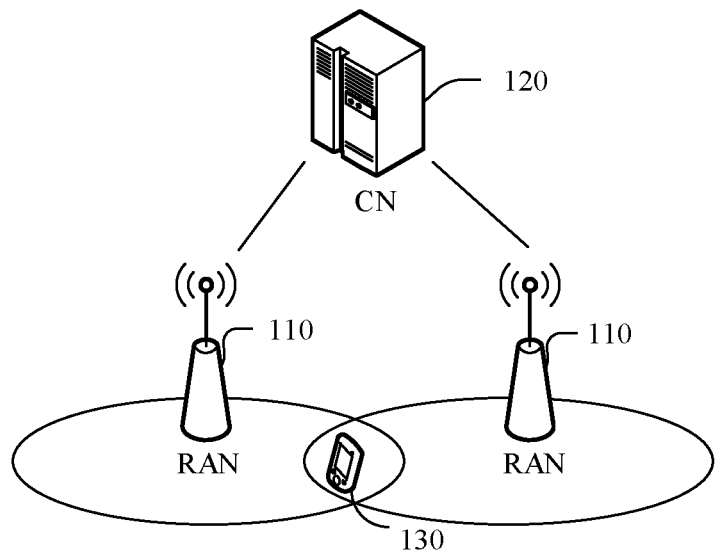
FIG. 1 is a schematic diagram of a communications system to which an embodiment of this application is applicable.

FIG. 1 is a schematic diagram of a communications system 100 to which an embodiment of this application is applicable. As shown in FIG. 1, a terminal 130 connects to a wireless network, to obtain a service from an external network (for example, the internet) over the wireless network, or communicate with another terminal over the wireless network. The wireless network includes a RAN 110 and a core network (CN) 120. The RAN 110 is used to connect the terminal 130 to the wireless network. The CN 120 is used to manage the terminal 130 and provide a gateway for communicating with the external network.

A terminal, also referred to as a terminal device, user equipment (UE), a mobile station (MS), a mobile terminal (MT), or the like, is a device that provides a user with voice/data connectivity. For example, the terminal is a handheld device or a vehicle-mounted device with a wireless connection function. Currently, some examples of the terminal are: a mobile phone (mobile phone), a tablet computer, a notebook computer, a palmtop computer, a mobile internet device (MID), a wearable device, a virtual reality (VR) device, an augmented reality (AR) device, a wireless terminal in industrial control (industrial control), a wireless terminal in self driving (self-driving), a wireless terminal in a remote medical surgery (remote medical surgery), a wireless terminal in a smart grid (smart grid), a wireless terminal in transportation safety (transportation safety), a wireless terminal in a smart city (smart city), or a wireless terminal in a smart home (smart home).

A network device is a device in a wireless network. For example, the network device is a radio access network (RAN) node that connects a terminal to the wireless network. Currently, some examples of the RAN node are: a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), or a wireless fidelity (Wi-Fi) access point (AP). In a network structure, the network device may include a centralized unit (CU) node, a distributed unit (DU) node, or a RAN device including a CU node and a DU node.

Figure 2:
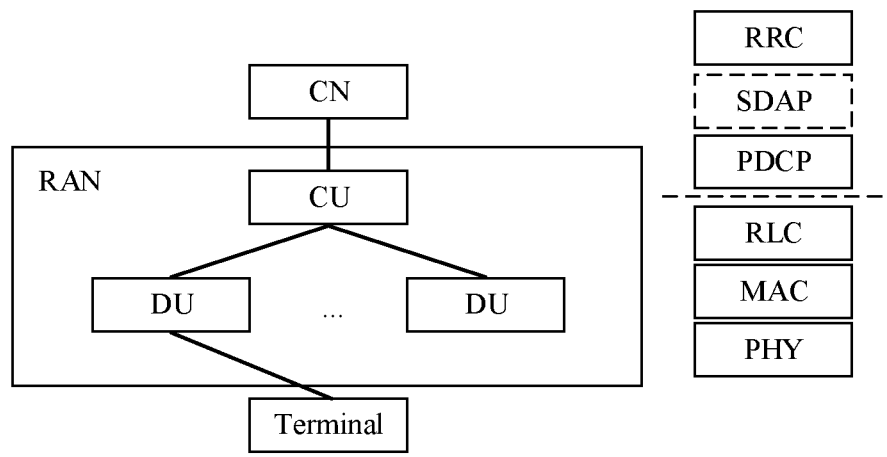
FIG. 2 is a schematic diagram of a network architecture to which an embodiment of this application is applicable.

FIG. 2 is a schematic diagram of a network architecture according to an embodiment of this application. As shown in FIG. 2, the network architecture includes a core network (CN) device and a RAN device. The RAN device includes a baseband apparatus and a radio frequency apparatus. The baseband apparatus may be implemented by one node, or may be implemented by a plurality of nodes. The radio frequency apparatus may be independently implemented remotely from the baseband apparatus, or may be integrated into the baseband apparatus, or a part of the radio frequency apparatus is implemented remotely from the baseband apparatus and a remaining part is integrated into the baseband apparatus. For example, in an LTE communications system, a RAN device (eNB) includes a baseband apparatus and a radio frequency apparatus. The radio frequency apparatus may be remotely disposed relative to the baseband apparatus. For example, a remote radio unit (RRU) is remotely disposed relative to a BBU.

Communication between the RAN device and a terminal complies with a specific protocol layer structure. For example, a control plane protocol layer structure may include functions of protocol layers such as a radio resource control (RRC) layer, a packet data convergence protocol (PDCP) layer, a radio link control (RLC) layer, a media access control (MAC) layer, and a physical layer. A user plane protocol layer structure may include functions of protocol layers such as a PDCP layer, an RLC layer, a MAC layer, and a physical layer. In implementation, a service data adaptation protocol (SDAP) layer is further included above the PDCP layer.

The functions of these protocol layers may be implemented by one node, or may be implemented by a plurality of nodes. For example, in an evolved structure, a RAN device may include a centralized unit (CU) and a distributed unit (DU). A plurality of DUs may be centrally controlled by one CU. As shown in FIG. 2, a CU and a DU may be divided based on a protocol layer of a wireless network. For example, functions of both the PDCP layer and a layer above the PDCP layer are set on the CU, and functions of protocol layers below the PDCP layer, such as the RLC layer and the MAC layer, are set on the DU.

The RAN device may implement functions of protocol layers such as a radio resource control (RRC) layer, a packet data convergence protocol (PDCP) layer, a radio link control (RLC) layer, and a media access control (MAC) layer by using one or more nodes. For example, in the evolved structure, the RAN device may include the centralized unit (CU) and the distributed unit (DU), and the plurality of DUs may be centrally controlled by one CU. As shown in FIG. 2, the CU and the DU may be divided based on the protocol layer of the wireless network. For example, the functions of both the PDCP layer and the layer above the PDCP layer are set on the CU, and the functions of the protocol layers below the PDCP layer, such as the RLC layer and the MAC layer, are set on the DU.

Division based on the protocol layer is merely an example, and division may alternatively be performed based on another protocol layer, such as the RLC layer. Functions of both the RLC layer and a protocol layer above the RLC layer are set on the CU, and a function of a protocol layer below the RLC layer is set on the DU. Alternatively, division is performed at a protocol layer. For example, some functions of the RLC layer and a function of a protocol layer above the RLC layer are set on the CU, and a remaining function of the RLC layer and a function of a protocol layer below the RLC layer are set on the DU. In addition, the division may alternatively be performed in another manner. For example, the division is performed based on a latency. A function whose processing time needs to meet a latency requirement is set on the DU, and a function whose processing time does not need to meet the latency requirement is set on the CU.

In addition, the radio frequency apparatus may be not placed in the DU but is placed remotely from the DU, or may be integrated into the DU, or a part is placed remotely from the DU and a remaining part is integrated into the DU. This is not limited herein.

Figure 3:
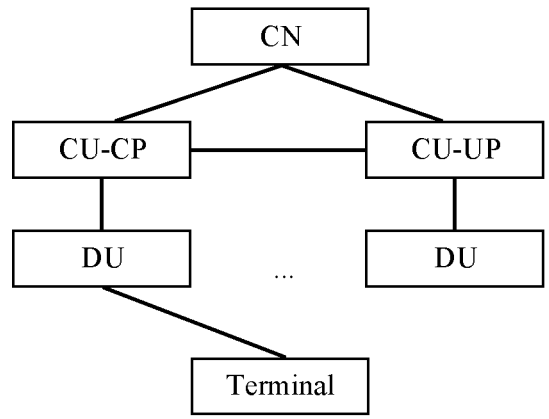
FIG. 3 is another schematic diagram of a network architecture to which an embodiment of this application is applicable.

FIG. 3 is another schematic diagram of a network architecture to which an embodiment of this application is applicable. Compared with that in the architecture shown in FIG. 2, a control plane (CP) and a user plane (UP) of a CU may be separated and implemented by using different entities. The different entities are respectively a control plane CU entity (CU-CP entity) and a user plane UP entity (CU-UP entity).

In the foregoing network architecture, signaling generated by the CU may be sent to a terminal by using a DU, or signaling generated by a terminal may be sent to the CU by using a DU. The DU may transparently transmit the signaling to the terminal or the CU by directly encapsulating the signaling at a protocol layer without parsing the signaling. In the following embodiments, if transmission of such signaling between the DU and the terminal is included, that the DU sends or receives the signaling includes this scenario. For example, signaling at an RRC layer or a PDCP layer is finally processed as signaling at a PHY layer and sent to the terminal, or is converted from received signaling at a PHY layer. In this architecture, it may also be considered that the signaling at the RRC layer or the PDCP layer is sent by the DU, or sent by the DU and a radio frequency.

In the foregoing embodiments, the CU is classified as a network device on a RAN side. In addition, the CU may alternatively be classified as a network device on a CN side. This is not limited herein.

An apparatus in the following embodiments of this application may be located in a terminal or a network device based on functions implemented by the apparatus. When the foregoing CU-DU structure is used, a network device may be a CU node, a DU node, or a RAN device including a CU node and a DU node.

It should be understood that the foregoing FIG. 1 to FIG. 3 are merely an example for description, but shall not constitute any limitation on this application.

The solutions in this application may be applicable to a new radio-unlicensed (NR-U) cell. However, this is not limited in this application. The NR-U cell can meet any of the following scenarios:

Scenario A: Carrier aggregation (CA) is performed between the NR-U cell and an NR cell.

In this scenario, the NR-U cell is used as a secondary cell (SCell), the NR cell is used as a primary cell (PCell), and the NR cell works on a licensed frequency band. The NR-U may be used to perform uplink transmission and downlink transmission, or may be used to perform only downlink transmission. A core network connected to the NR-U is a 5G core network (5G-CN).

Scenario B: Dual connectivity (DC) is performed between the NR-U cell and an LTE cell.

In this scenario, the NR-U cell is used as a primary secondary cell (PSCell), the LTE cell is used as a PCell, and the LTE cell works on a licensed frequency band. If a core network connected to the LTE PCell is an evolved packet core (EPC), or the LTE PCell may be connected to both an EPC and a 5G-CN, the LTE PCell may be preferentially connected to the 5G-CN.

Scenario C: Independent NR-U is configured. In other words, both uplink and downlink work on an unlicensed frequency band.

In this case, the NR-U can work independently, and a connected core network is a 5G-CN.

Scenario D: The independent NR-U cell is configured. In other words, uplink works on a licensed frequency band, and downlink works on an unlicensed frequency band.

In this case, a core network connected to NR-U is a 5G-CN.

Scenario E: Dual connectivity is performed between an NR cell and NR-U.

In this case, in this scenario, the NR-U cell is used as a primary secondary cell (PSCell), the NR cell is used as a PCell, and the NR cell works on a licensed frequency band. A core network of the PCell is a 5G-CN.

It should be understood that the scenario A to the scenario E are merely an example for description, but shall not constitute any limitation on this application.

In the foregoing, the primary cell (PCell): The primary cell is a master cell group (MCG) cell that works on a primary frequency band. UE is configured to perform an initial connection establishment process or a connection re-establishment process.

The secondary cell (SCell): The secondary cell is a cell that provides an additional radio resource in addition to a special cell (SC) if the UE is configured with a CA function.

The special cell: For a dual connectivity operation, the special cell is a primary cell of the MCG or a primary secondary cell of an SCG. Otherwise, the special cell is a primary cell.

The primary secondary cell (PSCell): For the dual connectivity operation, the primary secondary cell is a cell that sends random access when the UE performs synchronous reconfiguration.

The secondary cell group (SCG): The secondary cell group is a subset of a serving cell that includes a PSCell and another secondary cell for UE configured with dual connectivity.

The serving cell (serving cell): For UE in an RRC_CONNECTED state, if a CA/DC is not configured, there is only one serving cell. If the CA/DC is configured, the serving cell includes a special cell and all secondary cells.

In the NR-U cell, each communications device, for example, a terminal device or a network device, may contend for using a resource on the unlicensed frequency band by using a listen before talk (LBT) (or referred to as monitor before transmit) mechanism.

The LBT is usually performed at a granularity of a channel (for example, 20 MHz). Before sending a signal (for example, a data signal) on a channel (for example, denoted as a first channel), a communications device may first detect whether the first channel is idle. For example, the communications device detects whether a nearby communications device is occupying the first channel to send a signal. The detection process may be referred to as a clear channel assessment (CCA) process or a channel access process.

In the embodiments of this application, there are at least two channel access processes, denoted as a first-type channel access process and a second-type channel access process.

The first-type channel access process (which may also be referred to as a fixed-duration-based channel access process) may be fixed-duration-based energy detection. If energy of a signal received by a communications device (the communications device may be a terminal device or a network device) within the fixed duration is less than or equal to a first preset threshold for a specific bandwidth, for example, 20 MHz, it is considered that a channel is idle, and the communications device can use the idle channel to transmit data. Otherwise, it is considered that the channel is busy, and the communications device does not use the busy channel to transmit data.

The second-type channel access process (which may also be referred to as a fallback-based channel access process) may be energy detection based on a fallback mechanism. A window is defined for a specific bandwidth. A range of a quantity of detected slots is defined at the window. A communications device randomly selects a value A in the window (or the value range). After the communications device detects at least A idle energy detection slots, it is considered that a channel is idle, and the communications device can use the idle channel to transmit data. Otherwise, it is considered that the channel is busy, and the communications device does not use the busy channel to transmit data. Idle energy detection indicates that energy of a signal received in a fixed duration is less than or equal to a second preset threshold. The first preset threshold and the second preset threshold may be predefined, for example, predefined in a protocol. This is not limited. In addition, there is no limitation relationship between the first preset threshold and the second preset threshold, and the first preset threshold and the second preset threshold may be the same or may be different.

When a channel access process is performed, two results may be obtained: The channel access process is completed and the channel access process is not completed. There is a plurality of time domain start locations in a time-frequency resource used for data transmission. If it is determined that a channel is idle before any time domain start location, it may be considered that the channel access process is completed. If it is determined that the channel is busy before all the time domain start locations, it may be considered that the channel access process is not completed.

In the prior art, a network device may indicate, by using one piece of DCI, both a resource used to transmit downlink data and a resource used to transmit a HARQ feedback for the downlink data. However, if the resource used to perform the HARQ feedback for the downlink data and the resource used to transmit the downlink data are not at a same COT, a terminal device performs the second-type channel access process for the HARQ feedback, and an implementation process is relatively complex.

In view of this, this application provides a transmission method. A network device first configures a dynamically scheduled downlink transmission resource or activates a semi-persistently scheduled downlink transmission resource by using first DCI. Then, the network device sends second DCI to a terminal device after completing a channel access process, to indicate an uplink transmission resource used to transmit a HARQ feedback for downlink data. Compared with that in the prior art, the network device indicates to allocate resources based on two pieces of DCI. When allocating the resources, the network device performs LBT. It is equivalent to that the network device shares with the terminal device, a COT corresponding to the uplink transmission resource. The terminal device obtains the resources in two batches, and shares an LBT effect of the network device. In this way, the terminal device is allowed to perform a first-type channel access process or the terminal device is allowed not to perform the channel access process. Therefore, the terminal device may send the feedback information on the uplink resource without performing a second-type channel access process, to simplify behavior of the terminal device, and reduce implementation complexity.

The following describes the embodiments of this application in detail with reference to the accompanying drawings.

To facilitate understanding of the embodiments of this application, the following several descriptions are provided before the embodiments of this application are described.

An uplink transmission resource/a downlink transmission resource in this application may include a resource in time domain and a resource in a frequency domain. In the time domain, a time-frequency resource may include one or more time domain units (which may alternatively be referred to as time units). In the frequency domain, a frequency domain resource may include one or more frequency domain units.

A time domain unit (which may also be referred to as a time unit) may be a symbol, a mini-slot (Mini-slot), a slot (slot), or a subframe (subframe). Duration of a subframe in the time domain may be 1 millisecond (ms). One slot includes seven or 14 symbols. One mini-slot may include at least one symbol (for example, two symbols, seven symbols, or 14 symbols, or any quantity of symbols fewer than or equal to 14 symbols). The enumerated time domain unit sizes are merely intended to facilitate understanding of the solutions in this application, and should not be construed as a limitation on the present disclosure. It may be understood that the time domain unit sizes may be other values. This is not limited in this application.

A frequency domain unit may be a physical resource block (PRB), a resource block (RB), a resource block group (RBG), or a predefined subband (subband).

In the embodiments of this application, first, second, third, fourth, and various numerical numbers are merely used for distinguishing for ease of description, and are not used to limit the scope of the embodiments of this application. For example, different DCI and different serving cell sequences are distinguished.

In the embodiments of this application, a "protocol" may be a standard protocol in the communications field. For example, the "protocol" may include an NR protocol, and a related protocol applicable to a future communications system. This is not limited in this application.

In the embodiments of this application, "a plurality of" means two or more, and another quantifier is similar to this. The term "and/or" describes an association relationship for describing associated objects and represents that three relationships may exist. For example, A and/or B may represent the following three cases: Only A exists, both A and B exist, and only B exists. In addition, an element (element) that appears in singular forms "a", "an", and "the" does not mean "one or only one" unless otherwise specified in the context, but means "one or more". For example, "a device" means one or more such devices. Further, "at least one (at least one of) . . . " means one or any combination of subsequent associated objects. For example, "at least one of A, B, and C" includes A, B, C, AB, AC, BC, or ABC.

It should be understood that the transmission method provided in this application may be applicable to a wireless communications system, for example, the wireless communications system 100 shown in FIG. 1. The terminal device in the embodiments of this application may simultaneously communicate with one or more network devices. For example, the network device in the embodiments of this application may correspond to the network device 110 in FIG. 1, and the terminal device in the embodiments of this application may correspond to the terminal device 130.

Without loss of generality, the following describes the embodiments of this application in detail by using an interaction process between a terminal device and a network device as an example. The terminal device may be any terminal device that is in a wireless communications system and that has a wireless connection relationship with one or more network devices. It may be understood that any terminal device in the wireless communications system may implement wireless communication based on a same technical solution. This is not limited in this application.

Figure 4:
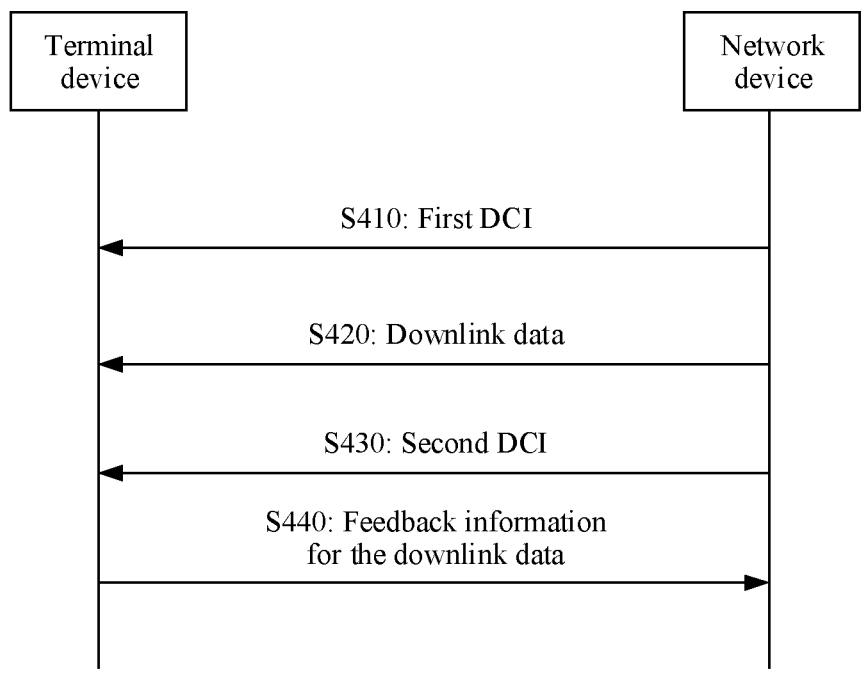
FIG. 4 is a schematic interaction diagram of a transmission method according to an embodiment of this application.

FIG. 4 is a schematic flowchart of an uplink transmission method 400 according to an embodiment of this application, and is illustrated from a perspective of device interaction. As shown in FIG. 4, the method 400 shown in FIG. 4 may include steps S410 to S440. The following describes each step in detail. It should be understood that the method 400 is described by using only a terminal device and a network device as execution bodies. During specific implementation, the terminal device may be replaced with a chip configured in a terminal device, and the network device may be replaced with a chip configured in a network device.

S410: The network device sends first DCI to the terminal device. Correspondingly, the terminal device receives the first DCI sent by the network device.

The first DCI is used to indicate or activate a downlink transmission resource. The downlink transmission resource may be used for initial transmission or retransmission for downlink data.

It should be noted that, a resource for transmitting the first DCI and the downlink transmission resource may be located in a same serving cell (serving cell), a same BWP, or a same subband (subband). Alternatively, a resource for transmitting the first DCI and the downlink transmission resource may be located in different serving cells, different BWPs, or different subbands. One cell includes at least one carrier. One carrier includes at least one BWP. One BWP includes at least one subband (subband).

In this application, the first DCI may be used for dynamic scheduling or semi-persistent scheduling. The following describes the two scenarios separately.

Scenario 1: The Dynamic Scheduling

In the dynamic scheduling scenario, the first DCI is used to indicate the downlink transmission resource. The downlink transmission resource is, for example, a physical downlink shared channel (PDSCH) resource. In other words, the first DCI may include time-frequency resource information of a PDSCH. The terminal device may determine the downlink transmission resource or the PDSCH resource based on the time-frequency resource information.

In an implementation, the first DCI may further include a HARQ process (process) identifier (ID). The terminal device may transmit a HARQ feedback based on the HARQ process ID.

In an implementation, the first DCI may further include time range indication information. The terminal device may determine a time range based on the indication information. The time range is a time range in which the terminal device expects to receive second DCI.

For example, the time range indication information may indicate a start time and an end time of the time range. The terminal device determines the time range based on the start time and the end time. Alternatively, the time range indication information may indicate a start time and duration (duration) of the time range. The terminal device determines the time range based on the start time and the duration. Alternatively, the time range indication information may indicate duration. The terminal device determines the time range based on a receiving time of the first DCI and the duration.

The time range is a time range in which the terminal device expects to receive second DCI. The terminal device monitors a downlink control channel in a target time period to obtain the second DCI. The target time period may be the time range, or may be a part of the time range. In other words, the terminal device may monitor the downlink control channel in the time range indicated by the first DCI, may expect to receive the second DCI in the time range indicated by the first DCI, or monitor the downlink control channel in the part of the time range with reference to other information, to obtain the second DCI. A start time and an end time of the target time period are described in detail in the following. Details are not described herein.

Scenario 2: The Semi-Persistent Scheduling

In the semi-persistent scheduling scenario, before the step S410, the network device may further send configuration information to the terminal device. In an implementation, the first DCI may include frequency domain information of the downlink transmission resource. The configuration information may be used to configure time domain information of the downlink transmission resource. In another implementation, the first DCI is used to activate the downlink transmission resource. The configuration information may include time domain information of the downlink transmission resource and frequency domain information of the downlink transmission resource. The configuration information may be carried in a radio resource control (RRC) message. However, this is not limited in this embodiment of this application.

In an implementation, the downlink transmission resource in the semi-persistent scheduling scenario may be periodic. For example, the downlink transmission resource repeatedly appears every N subframes, and a semi-persistent scheduling period is N subframes, where N is a positive integer. The period is merely an example, and may also be set by using another time domain unit. It should be understood that the downlink transmission resource in the semi-persistent scheduling scenario may not be periodic. This is not limited in this application.

Relationships between different semi-persistent scheduling resources and different HARQ process IDs may be pre-specified in a protocol. For example, a HARQ process ID corresponding to a subframe 0, a HARQ process ID corresponding to a subframe 10, a HARQ process ID corresponding to a subframe 20, and the like may be pre-specified in the protocol. Both the network device and the terminal device may determine, according to a rule pre-specified in the protocol, HARQ process IDs corresponding to downlink data transmission on different semi-persistent scheduling resources.

S420: The network device transmits downlink data on the downlink transmission resource. Correspondingly, the terminal device receives the downlink data on the downlink transmission resource.

The terminal device receives the downlink data on the downlink transmission resource, decodes the downlink data to obtain a decoding result: an acknowledgment (ACK) or a negative acknowledgment (NACK), and stores a correspondence between the decoding result of the downlink data and a HARQ process. The ACK indicates that the terminal device performs the decoding correctly, and the NACK indicates that the terminal device does not perform the decoding correctly. It should be noted that the ACK and NACK may be at a transport block (TB) level or at a code block (CB) level, and one TB may include a plurality of CBs.

S430: The network device sends the second DCI to the terminal device. Correspondingly, the terminal device receives the second DCI sent by the network device.

Specifically, after completing a first-type channel access process or a second-type channel access process, the network device sends the second DCI to the terminal device, to notify the terminal device of an uplink transmission resource. It is equivalent to sharing a corresponding COT with the terminal device. The second DCI is used to indicate the uplink transmission resource. The uplink transmission resource is used to transmit HARQ feedback information (feedback information for short) for the downlink data. The uplink transmission resource may be a physical uplink shared channel (PUSCH) resource or a physical uplink control channel (PUCCH) resource. This is not limited in this application.

In this application, the second DCI may indicate that the terminal device is allowed to perform the first-type channel access process, or the second DCI may indicate that the terminal device is allowed not to perform a channel access process. Whether the terminal device performs the first-type channel access process or whether the terminal device performs the channel access process may be determined by the terminal device.

The second DCI may explicitly indicate that the terminal device is allowed to perform the first-type channel access process. For example, the second DCI may carry indication information, and the indication information indicates that the terminal device is allowed to perform the first-type channel access process. Alternatively, the second DCI may implicitly indicate that the terminal device is allowed to perform the first-type channel access process. For example, the second DCI indicates that the terminal device is allowed to perform the first-type channel access process. The "second DCI" includes a DCI format (format) and/or an RNTI used to scramble a CRC of the second DCI. In other words, if the terminal device receives DCI in a specific (or a dedicated) DCI format, or DCI whose CRC is scrambled by using a specific RNTI, the terminal device may determine that the network device allows the terminal device to perform the first-type channel access process. The specific DCI format and/or the RNTI may be configured by the network device. For example, the network device may configure the specific DCI format and/or the RNTI by using an RRC message.

Similar to a manner in which the second DCI indicates that the terminal device is allowed to perform the first-type channel access process, the second DCI may explicitly or implicitly indicate that the terminal device is allowed not to perform the channel access process. For details, refer to the foregoing descriptions in which the second DCI indicates that the terminal device is allowed to perform the first-type channel access process. Details are not described herein again.

When the second DCI is received, the terminal device may perform the first-type channel access process. After the first-type channel access process is completed, the terminal device may send the feedback information by using the uplink transmission resource. Alternatively, when the second DCI is received, the terminal device may send the feedback information by using the uplink transmission resource without performing the first-type channel access process. It should be noted that a bandwidth of a channel may be 20 MHz, but an allocated uplink resource may occupy only a part of the bandwidth of 20 MHz. The terminal device performs the channel access process by using a channel as a granularity, namely, the 20 MHz.

It should be further noted that, a serving cell in which the first DCI is transmitted or a serving cell in which a resource for transmitting the first DCI is located and a serving cell in which the second DCI is transmitted or a serving cell in which a resource for transmitting the second DCI is located may be a same cell or may be different cells.

In this specification, for ease of understanding, the serving cell in which the first DCI is transmitted is denoted as a first serving cell. A serving cell in which the uplink transmission resource is located is denoted as a second serving cell. The serving cell in which the second DCI is transmitted is denoted as a third serving cell.

The first serving cell corresponds to the third serving cell, or the first serving cell and the third serving cell are associated. Further, to achieve an objective in which the terminal device learns of a serving cell in which the second DCI is received, the network device may configure a correspondence between the first serving cell and the third serving cell, or may preset a correspondence between the first serving cell and the third serving cell. For example, the network device may configure the correspondence between the first serving cell and the third serving cell by using an RRC message or the first DCI. For another example, the correspondence between the first serving cell and the third serving cell may be specified in a protocol.

It should be understood that the second serving cell and the third serving cell may be a same cell, or may be different cells. The resource for transmitting the second DCI and the uplink transmission resource allocated by using the second DCI may be located in a same BWP, or a same subband. Alternatively, the resource for transmitting the second DCI and the uplink transmission resource allocated by using the second DCI may be located in different BWPs, or different subbands.

In addition, in an implementation, the second DCI further includes at least one piece of the following information:

(1) ID information of the terminal device. For example, the ID may be a cell radio network temporary identifier (C-RNTI), and is used to identify the terminal device. In other words, the network device may indicate, by using the ID information of the terminal device, in the second DCI, a terminal device to which the second DCI is specific.

The second DCI may not include the ID information of the terminal device, and the second DCI may be broadcast or multicast.

(2) ID information of the first serving cell

If a plurality of serving cells are configured for the terminal device, the network device indicates the second DCI is specific to first DCI of a serving cell or serving cells. In other words, the uplink transmission resource indicated by the second DCI is used to perform the HARQ feedback on a downlink transmission resource of a cell. If the second DCI does not include the ID information of the first serving cell, the terminal device may determine, based on a cell corresponding to a resource for transmitting the second DCI, namely, a third serving cell, that the second DCI is first DCI of a cell. As described above, the correspondence between the first cell and the third cell may be configured by using the RRC message or specified in the protocol. Therefore, the terminal device may determine the first serving cell based on the third serving cell.

(3) ID information of the second serving cell

The second DCI carries the ID information of the second serving cell, to indicate the terminal device that a serving cell in which the uplink transmission resource is located is in a serving cell.

If the second DCI does not include the ID information of the second serving cell, it may be considered that the second serving cell and the downlink transmission resource correspond to a same serving cell.

(4) ID information of a HARQ process

The HARQ process is a HARQ process corresponding to the second DCI. In other words, the uplink transmission resource indicated by the second DCI is used to perform HARQ feedbacks for HARQ processes.

One serving cell may include a plurality of HARQ processes. The network device indicates a HARQ process or HARQ processes to which the second DCI is specific. In this case, the terminal device may perform the HARQ feedback based on a HARQ process corresponding to the downlink data scheduled by using the first DCI.

If the second DCI does not include the ID information of the HARQ process, the HARQ process corresponding to the second DCI may be determined in other three manners.

Manner 1:

The network device sends configuration information to the terminal device. The configuration information is used to indicate HARQ processes corresponding to the HARQ feedback performed by the terminal device on the uplink transmission resource indicated by the second DCI. In other words, the network device preconfigures IDs of these HARQ processes. The terminal device sends, to the network device by using the uplink transmission resource configured by using the second DCI, HARQ feedbacks of HARQ processes corresponding to the IDs of these HARQ processes. For example, the network device configures HARQ processes 1/2/3 by using RRC signaling. When receiving the second DCI, the terminal device sends feedback information of the HARQ processes 1/2/3 to the network device on the uplink transmission resource configured by using the second DCI. It should be understood that the downlink data scheduled by using the first DCI may correspond to one or more of the HARQ processes 1/2/3.

Manner 2:

HARQ processes corresponding to the second DCI are all HARQ processes.

In other words, after receiving the second DCI, the terminal device sends feedback information for all the HARQ processes to the network device. It should be understood that the downlink data scheduled by using the first DCI may correspond to one or more of all the HARQ processes.

Manner 3:

The network device configures a maximum quantity of HARQ processes that can be fed back. The terminal device notifies the network device of a HARQ process or HARQ processes for which feedback information is specific.

(5) ID information of an uplink BWP. The uplink BWP is a BWP to which the uplink transmission resource belongs.

In other words, an ID of the uplink BWP indicates a BWP on which the uplink transmission resource configured by using the second DCI is located. If the uplink BWP indicated by the second DCI is not a currently activated uplink BWP, the terminal device performs an uplink BWP switching process, to switch from the activated uplink BWP to an indicated uplink BWP. For example, the terminal device configures four BWPs: a BWP 1, a BWP 2, a BWP 3, and a BWP 4, and a currently activated BWP is the BWP 1. If the ID, of the uplink BWP, indicated by the network device is the BWP 2, the currently activated BWP is switched to the BWP 2.

If the second DCI does not include the ID information of the uplink BWP, the uplink transmission resource configured by using the second DCI is on a currently activated UL BWP.

(6) ID information of a subband. The subband is a subband to which the uplink transmission resource belongs.

In other words, an ID of the subband is used to indicate a subband on which the uplink transmission resource is located. The terminal device sends the feedback information to the network device on the indicated subband.

If the second DCI does not include the ID information of the subband, it may be considered that the uplink transmission resource and the downlink transmission resource correspond to a same subband.

In conclusion, the second DCI may include one or more of (1) to (6), or the second DCI may not include any one of (1) to (6).

Optionally, in an embodiment of this application, when the terminal device receives the second DCI, if there is no running random access process or a running random access process is completed, the terminal device starts or restarts a BWP inactivity timer (bwp-inactivitytimer). Further, when the bwp-inactivitytimer expires, an activated downlink BWP is switched to an initial downlink BWP or a default downlink BWP. The initial downlink BWP is a BWP used to initiate initial access. The default downlink BWP is indicated by the network device.

The BWP inactivity timer is started or restarted, a BWP activation time may be prolonged, and the BWP can be used for data transmission.

Optionally, in an embodiment of this application, when receiving the second DCI, the terminal device starts or restarts a secondary cell deactivation timer (scell-deactivationtimer). If the scell-deactivationtimer expires, the secondary cell SCell is deactivated. The timer is used for secondary cell maintenance.

The secondary cell deactivation timer is started or restarted, a SCell deactivation time is prolonged, and the S Cell may be used for data transmission.

In an embodiment of this application, a CRC of the first DCI may be scrambled by using a first RNTI, and a CRC of the second DCI may be scrambled by using a second RNTI. The first RNTI may be the same as or different from the second RNTI. This is not limited in this application. The first RNTI and the second RNTI may be dedicated RNTIs, and may uniquely identify the terminal device.

When the first RNTI is the same as the second RNTI, to distinguish between the first RNTI and the second RNTI, each of the first DCI and the second DCI may include an indicator bit. The indicator bit is used to distinguish between the first DCI and the second DCI. For example, if DCI includes an indicator bit, when a value of the indicator bit is 0, it indicates that the DCI in which the indicator bit is located is the first DCI. If a value of the indicator bit is 1, it indicates that the DCI in which the indicator bit is located is the second DCI. A meaning of a value of the indicator bit may also be reversed. This is not limited in this application.

Further, the second RNTI may be any one of the following: a C-RNTI, a configured scheduling radio network temporary identifier (CS-RNTI), an interruption radio network temporary identifier (INT-RNTI), a slot format radio network temporary identifier (SFI-RNTI), a semi-persistent CSI radio network temporary identifier (SP-CSI-RNTI), a transmit power control-physical uplink control channel-radio network temporary identifier (TPC-PUCCH-RNTI), a transmit power control-physical uplink shared channel-radio network temporary identifier (TPC-PUSCH-RNTI), a transmit power control-sounding reference signal-radio network temporary identifier (TPC-SRS-RNTI), and a modulation and coding scheme-radio network temporary identifier (MCS-RNTI). For a specific meaning of each RNTI, refer to the prior art. Details are not described herein. In addition, the second RNTI may alternatively be a newly introduced RNTI, for example, may be an RNTI that may be introduced in a subsequent protocol.

It should be understood that the first RNTI may also be any one of the foregoing RNTIs.

S440: The terminal device sends feedback information for the downlink data on the uplink transmission resource.

Correspondingly, the network device receives the feedback information for the downlink data on the uplink transmission resource.

The terminal device may send, to the network device based on indication of the second DCI, the stored feedback information including the decoding result (the ACK or the NACK) of the downlink data. The terminal device may perform the first-type channel access process based on the indication of the second DCI. After completing the first-type channel access process, the terminal device sends, to the network device, the stored feedback information including the decoding result (the ACK or the NACK) of the downlink data. Alternatively, after receiving the second DCI, the terminal device does not perform the channel access process, but directly sends to the network device, the stored feedback information including the decoding result (the ACK or the NACK) of the downlink data.

According to the transmission method provided in this application, the network device indicates to allocate resources based on two pieces of DCI. When allocating the resources, the network device performs LBT. It is equivalent to that the network device shares with the terminal device, a COT corresponding to the uplink transmission resource. The terminal device obtains the resources in two batches, and shares an LBT effect of the network device. In this way, the terminal device is allowed to perform the first-type channel access process or the terminal device is allowed not to perform the channel access process. Therefore, the terminal may send the feedback information on the uplink resource without performing the second-type channel access process, to simplify behavior of the terminal device, and reduce implementation complexity. In addition, because the uplink transmission resource can be flexibly allocated by using the second DCI, the network device can flexibly schedule the uplink resource and the downlink resource. This improves resource utilization.

In an embodiment of this application, the uplink transmission resource and the downlink transmission resource may belong to different COT. For example, the downlink transmission resource may belong to a COT #1, and the uplink transmission resource may belong to a COT #2. However, this is not limited in this application.

Figure 5:
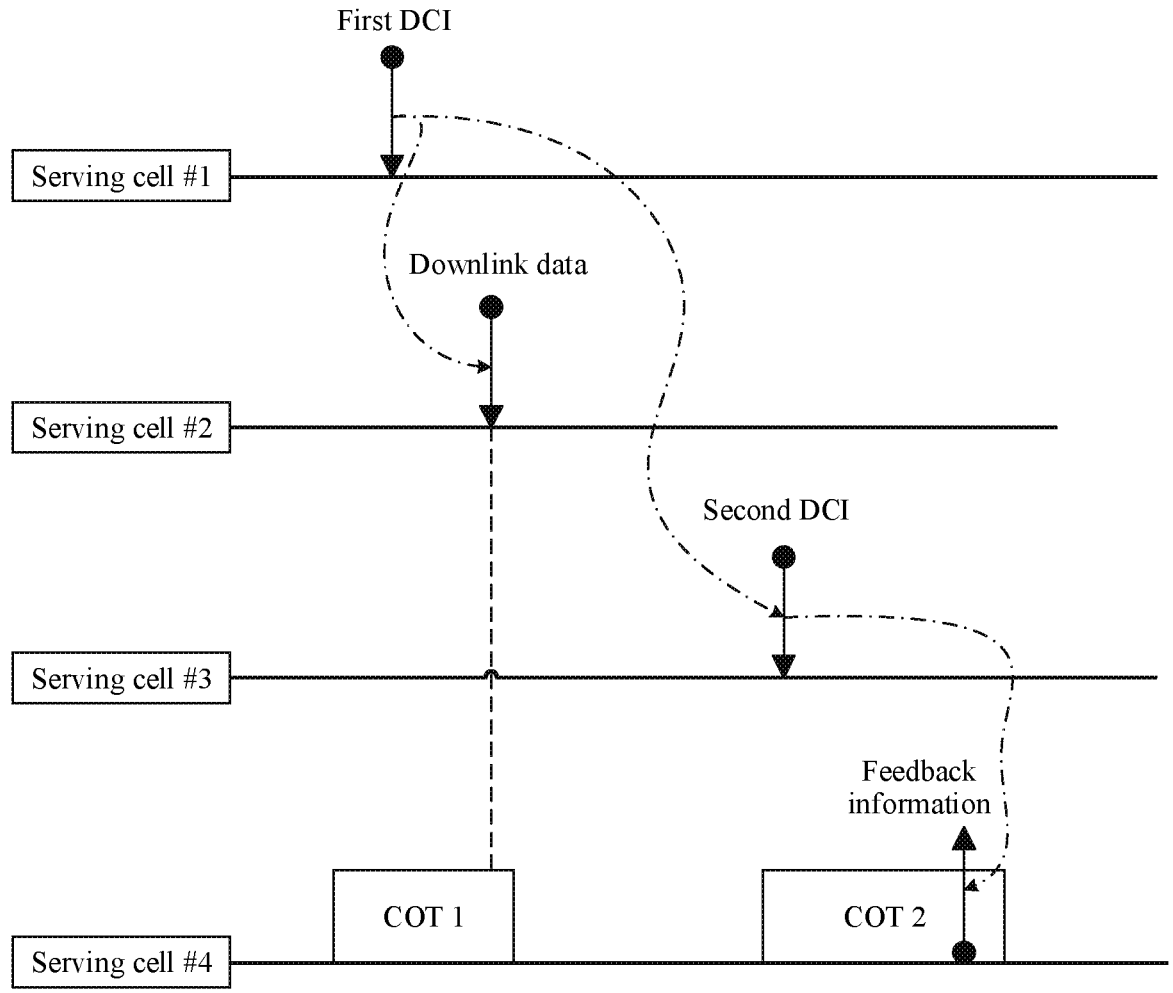
FIG. 5 is a schematic diagram of performing uplink and downlink transmission by using a method according to this application.

For example, FIG. 5 is a schematic diagram of performing uplink and downlink transmission by using a method according to an embodiment of this application. Referring to FIG. 5, first DCI is sent in a serving cell #1 (namely, an example of a first serving cell), and a resource of downlink data, namely, a downlink transmission resource, is in a serving cell #2. Second DCI is sent in a serving cell #3 (namely, an example of a third serving cell). An uplink transmission resource indicated by the second DCI is in a serving cell #4 (namely, an example of a second serving cell). Before sending the first DCI, a network device needs to perform a channel access process, and sends the first DCI and the downlink data in a corresponding COT after completing channel access. A time point at which a terminal device receives the downlink data corresponds to a COT 1 of the serving cell #4. Because the COT 1 is about to end, a HARQ feedback cannot be performed in the COT 1 and can be performed only in a subsequent COT, for example, a COT 2. After completing a second-type channel access process, the network device shares the COT 2 with the terminal device. In this way, a cross-COT HARQ feedback is implemented. It should be understood that, if four cells in the figure are a same cell, the first DCI and the downlink data may be in the COT 1, and the second DCI and the HARQ feedback (namely, the feedback information in this application) may be in the COT 2.

In conclusion, according to the transmission method provided in this application, the cross-COT HARQ feedback can be implemented.

The following describes a specific implementation of the step S430 by using an example.

In a specific implementation of the step S430, the terminal device may monitor a downlink control channel in a target time period to obtain the DCI.

Specifically, a media access control (MAC) entity of the terminal device may monitor the downlink control channel in the target time period to obtain the DCI.

In an implementation, a time range in which the terminal device expects to receive the second DCI may be defined. The time range may be configured by the network device, for example, indicated by using the first DCI, or may be configured by the network device by using other signaling, for example, RRC signaling. Time information configured by the network device may include a start time and an end time of the time range, include a start time and duration, include an end time and duration, or include duration. The start time and the end time may be preset, may be configured by using other signaling, or may be determined by the terminal device in another manner. A determining manner is used as an example in the following embodiment. The time range may be used as an activation time. A meaning of the activation time is the same as a meaning of another existing DRX activation time. In other words, the terminal device monitors PDCCHs of all activated serving cells in the time range. Alternatively, as a redefined activation time, the terminal device monitors only a PDCCH of a specific activated serving cell in the time range, namely, a PDCCH of a serving cell in which the second DCI can be transmitted. For example, the serving cell is the third serving cell.

In this case, a DRX activation time includes the target time period, or a DRX activation time does not include the target time period. In other words, the target time period belongs to the DRX activation time, or the target time period does not belong to the DRX activation time. It should be understood that if the DRX activation time includes the target time period, the terminal device monitors the PDCCHs of all activated serving cells in the target time period. If the DRX activation time does not include the target time period, the terminal device monitors the PDCCH of the specific activated serving cell in the target time period, namely, the PDCCH of the serving cell in which the second DCI can be transmitted. For example, the serving cell is the third serving cell.

It can be learned that a MAC entity is not in the activation time (the DRX activation time). When the first DCI is expected to be received, the terminal device (which may be specifically the MAC entity of the terminal device) monitors a PDCCH in a corresponding serving cell, to receive the second DCI addressed to a dedicated RNTI (The MAC entity shall monitor the PDCCH for 2nd DCI addressed to dedicated RNTI on the corresponding serving cell even if the MAC entity is not in Active Time when such is expected.).

The "when such is expected" indicates the time range or the target time period.

The "corresponding serving cell" is the "first serving cell" in this specification. The first serving cell is a serving cell in which the second DCI is transmitted. For details about the first serving cell, refer to the foregoing descriptions. Details are not described herein again.

The "the second DCI addressed to a dedicated RNTI" indicates that the CRC of the second DCI is scrambled by using the dedicated RNTI. The dedicated RNTI corresponds to the second RNTI in the foregoing description. For details, refer to the foregoing descriptions. Details are not described herein again.

Further, the start time of the target time period may be determined based on a location of the first DCI or a location of the downlink data. For example, the start time of the target time period may be an end location of the first DCI, an end location of the downlink data, or an Xth symbol after any one of the foregoing end locations, where X is a positive integer. Alternatively, the start time of the target time period may be configured by the network device.

The end time (or referred to as a terminate time) of the target time period may be a time at which the second DCI is received, or may be configured by the network device.

The network device may preconfigure the start time and/or the end time of the time range. For example, the network device may preconfigure the start time and/or the end time of the time range by using an RRC message. Alternatively, the network device configures the start time and/or the end time of the time range by using the first DCI. It should be understood that the network device may configure the time range by configuring the start time+the duration, the end time+the duration, the start time+the end time, or the like. A specific configuration manner is not limited in this application. The time range is a time range in which the terminal device expects to receive the second DCI. The terminal device monitors the downlink control channel in the target time period to obtain the second DCI. The target time period may be the time range, or may be a part of the time range. In other words, the terminal device may monitor the downlink control channel in the time range indicated by the first DCI, may expect to receive the second DCI in the time range indicated by the first DCI, or monitor the downlink control channel in the part of the time range with reference to other information, to obtain the second DCI. The following uses two scenarios, namely, the dynamic scheduling scenario and the semi-persistent scheduling scenario, as an example for description.

Scenario 1: The Dynamic Scheduling

The first DCI may carry time range indication information. The time range indication information indicates or includes the start time of the time range and the end time of the time range. The terminal device determines the time range based on the start time of the time range and the end time of the time range. Alternatively, the time range indication information indicates or includes the start time and the duration of the time range. The terminal device determines the time range based on the start time and the duration. Alternatively, the time range indication information indicates or includes the duration. The terminal determines the time range based on a receiving time of the first DCI and the duration indicated by using the first DCI.

The start time of the target time period may be determined based on the end location of the first DCI or the end location of the downlink data, for example, an Xth symbol after the end location of the first DCI or the end location of the downlink data, where X≥0, X is an integer, and X=0 is the end location of the first DCI or the end location of the downlink data. A value of X may be predefined in a protocol or may be preconfigured by the network device. For example, the network device may configure the value of X by using an RRC message.

The end time of the target time period may be determined in a plurality of manners. For example, if the terminal device receives the second DCI in the time range, the end time of the target time period may be a time at which the second DCI is received. For another example, if the terminal device does not receive the second DCI in the time range, the end time of the target time period is an end time of the time range. In a possible implementation, if the terminal device has not detected the second DCI until the end time of the time range, the terminal device may further start a retransmission timer (drx-RetransmissionTimer) after the end time, and monitor the PDCCH during running of the retransmission timer, and receive DCI that is sent by the network device and that is used for downlink retransmission.

Figure 6:
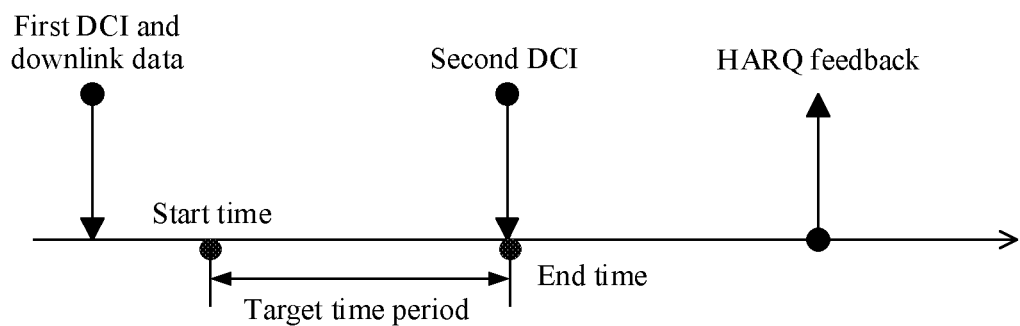
FIG. 6 is a schematic diagram of a target time period in a dynamic scheduling scenario.

For example, FIG. 6 is a schematic diagram of a start time and an end time of a target time period in a dynamic scheduling scenario. Referring to FIG. 6, a terminal device starts to monitor, from the start time, a PDCCH for transmitting second DCI. The terminal device uses a time at which the terminal device detects the second DCI as the end time of the target time period. After detecting the second DCI, the terminal device may perform HARQ feedback on an uplink transmission resource.

Figure 7:
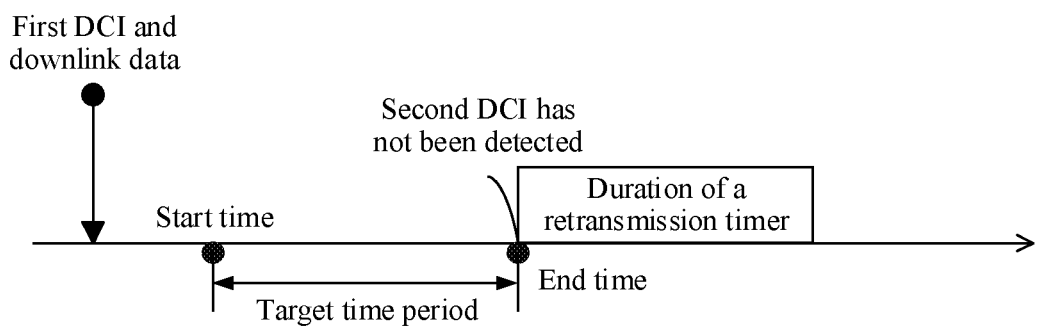
FIG. 7 is another schematic diagram of a target time period in a dynamic scheduling scenario.

FIG. 7 is another schematic diagram of a start time and an end time of a target time period in a dynamic scheduling scenario. Referring to FIG. 7, a terminal device starts to monitor, from the start time, a PDCCH for transmitting second DCI. If the terminal device has not detected the second DCI when the end time of the target time period arrives, the terminal device starts a retransmission timer.

Scenario 2: The Semi-Persistent Scheduling

In an implementation, the network device configures the duration of the time range. The start time of the time range may be determined by using the method for determining the start time of the target time period in the scenario 1. In this case, the start time of the target time period is the same as the start time of the time range. Determining the end time of the target time period is the same as that in the foregoing description of the scenario 1, and details are not described herein again.

In another implementation, the network device configures the time range in the semi-persistent scheduling scenario. The network device configures the start time and the duration of the time range, the start time and the end time of the time range, or the end time and the duration of the time range. A manner of determining the start time and the end time of the target time period is the same as that in the foregoing scenario 1. Details are not described herein again.

The foregoing describes in detail the transmission method in the embodiments of this application with reference to FIG. 4 to FIG. 7. The following describes in detail apparatuses in the embodiments of this application with reference to FIG. 8 to FIG. 10.

Figure 8:
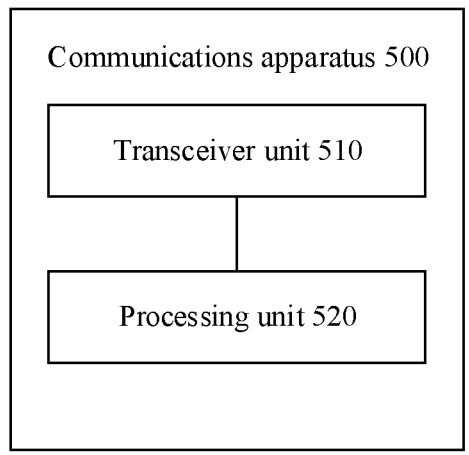
FIG. 8 is a schematic block diagram of a communications apparatus according to an embodiment of this application.

FIG. 8 is a schematic block diagram of a communications apparatus according to an embodiment of this application. As shown in FIG. 8, the apparatus 500 may include a transceiver unit 510 and a processing unit 520.

In a possible design, the apparatus 500 may be the terminal device in the foregoing method 400. For example, the apparatus 500 may be a terminal device, or a chip configured in a terminal device.

In a possible implementation, the transceiver unit 510 is configured to: receive first downlink control information, where the first downlink control information is used to indicate or activate a downlink transmission resource; receive downlink data on the downlink transmission resource; receive second downlink control information, where the second downlink control information is used to indicate an uplink transmission resource, and the uplink transmission resource is used to transmit feedback information for the downlink data; and send the feedback information on the uplink transmission resource.

Optionally, the transceiver unit 510 is specifically configured to monitor a downlink control channel in a target time period to obtain the second downlink control information. A discontinuous reception DRX activation time includes the target time period, or a discontinuous reception DRX activation time does not include the target time period.

Optionally, a start time of the target time period is determined based on an end location of the first downlink control information or an end location of the downlink data, or a start time of the target time period is configured by a network device.

Optionally, an end time of the target time period is a time at which the second downlink control information is received, or an end time of the target time period is configured by the network device.

Optionally, the first downlink control information includes time range indication information. The time range indication information is used to indicate a time range. The time range is a time range in which a terminal device expects to receive the second downlink control information.

Optionally, the second downlink control information is used to indicate that a type of a channel access process of the terminal device is a first type, or the second downlink control information is used to indicate the terminal device not to perform a channel access process.

Optionally, the downlink transmission resource and the uplink transmission resource belong to different channel occupancy time COT in time domain.

Optionally, the second downlink control information further includes at least one of the following:
  identifier information of the terminal device;
  identifier information of a first serving cell, where the first serving cell is a cell corresponding to the downlink transmission resource on which the first downlink control information is carried;
  identifier information of a second serving cell, where the uplink transmission resource is located in the second serving cell;
  identifier information of a HARQ process, where the HARQ process is a HARQ process corresponding to the second downlink control information;
  identifier information of an uplink bandwidth part BWP, where the uplink BWP is a BWP to which the uplink transmission resource belongs; and
  identifier information of a subband, where the subband is a subband to which the uplink transmission resource belongs.

Optionally, a cyclic redundancy check CRC of the first downlink control information is scrambled by using a first radio network temporary identifier RNTI. A CRC of the second downlink control information is scrambled by using a second RNTI. The first RNTI is the same as or different from the second RNTI.

Optionally, the first RNTI is the same as the second RNTI. Both of the first downlink control information and the second downlink control information respectively includes an indicator bit. The indicator bit is used to distinguish between the first downlink control information and the second downlink control information.

Optionally, the first serving cell in which the first downlink control information is transmitted corresponds to a third serving cell. The transceiver unit 510 is specifically configured to monitor a downlink control channel in the third serving cell to obtain the second downlink control information.

Optionally, a correspondence between the first serving cell and the third serving cell is configured for the terminal device by the network device, or a correspondence between the first serving cell and the third serving cell is preset.

Optionally, the processing unit 520 is configured to: when there is no running random access process or a running random access process is completed, start or restart a bandwidth part BWP inactivity timer; and/or
  start or restart a secondary cell deactivation timer, where the BWP inactivity timer is used for BWP switching, and the secondary cell deactivation timer is used for secondary cell deactivating.

It should be understood that the apparatus 500 may correspond to the terminal device in the method 400 according to the embodiments of this application. The apparatus 500 may include units configured to perform the method performed by the terminal device in the method 400. In addition, the units in the apparatus 500 and the foregoing other operations and/or functions are respectively used to implement corresponding procedures in the method 400. For a specific process of performing the foregoing corresponding steps by the units, refer to the foregoing descriptions with reference to the method embodiment in FIG. 4 to FIG. 7. For brevity, details are not described herein again.

It should be further understood that when the apparatus 500 is a chip configured in the terminal device, the transceiver unit 510 in the apparatus 500 may be an input/output interface.

In another possible design, the apparatus 500 may be the network device in the foregoing method 400. For example, the apparatus 500 may be a network device, or a chip configured in a network device.

In a possible implementation, the transceiver unit 510 is configured to: send first downlink control information, where the first downlink control information is used to indicate or activate a downlink transmission resource; send downlink data on the downlink transmission resource; send second downlink control information, where the second downlink control information is used to indicate an uplink transmission resource, and the uplink transmission resource is used to transmit feedback information for the downlink data; and receive the feedback information on the uplink transmission resource.

Optionally, the first downlink control information includes time range indication information. The time range indication information is used to indicate a time range. The time range is a time range in which a terminal device expects to receive the second downlink control information.

Optionally, the second downlink control information is used to indicate that a type of a channel access process of the terminal device is a first type, or the second downlink control information is used to indicate the terminal device not to perform a channel access process.

Optionally, the downlink transmission resource and the uplink transmission resource belong to different channel occupancy time COT in time domain.

Optionally, the second downlink control information further includes at least one of the following:
  identifier information of the terminal device;
  identifier information of a first serving cell, where the first serving cell is a cell corresponding to the downlink transmission resource on which the first downlink control information is carried;

identifier information of a second serving cell, where the uplink transmission resource is located in the second serving cell;

identifier information of a hybrid automatic repeat request HARQ process, where the HARQ process is a HARQ process corresponding to the second downlink control information;

identifier information of an uplink bandwidth part BWP, where the uplink BWP is a BWP to which the uplink transmission resource belongs; and identifier information of a subband, where the subband is a subband to which the uplink transmission resource belongs.

Optionally, a cyclic redundancy check CRC of the first downlink control information is scrambled by using a first radio network temporary identifier RNTI. A CRC of the second downlink control information is scrambled by using a second RNTI. The first RNTI is the same as or different from the second RNTI.

Optionally, the first RNTI is the same as the second RNTI. Both of the first downlink control information and the second downlink control information respectively includes an indicator bit. The indicator bit is used to distinguish between the first downlink control information and the second downlink control information.

Optionally, the first serving cell in which the first downlink control information is transmitted corresponds to a third serving cell, and the third serving cell is a cell in which the second downlink control information is located.

Optionally, a correspondence between the first serving cell and the third serving cell is configured for the terminal device by the network device, or a correspondence between the first serving cell and the third serving cell is preset.

It should be understood that the apparatus 500 may correspond to the network device in the method 400 according to the embodiments of this application. The apparatus 500 may include units configured to perform the method performed by the network device in the method 400. In addition, the units in the apparatus 500 and the foregoing other operations and/or functions are respectively used to implement corresponding procedures in the method 400. For a specific process of performing the foregoing corresponding steps by the units, refer to the foregoing descriptions with reference to the method embodiment in FIG. 4 to FIG. 7. For brevity, details are not described herein again.

It should be further understood that when the apparatus 500 is a chip configured in the network device, the transceiver unit 510 in the apparatus 500 may be an input/output interface.

It should be understood that division into the units in the foregoing apparatuses is merely logical function division. In actual implementation, all or some of the units may be integrated into a physical entity, or may be physically separate. In addition, all the units in the apparatuses may be implemented in a form of software invoked by a processing element, or may be implemented in a form of hardware; or some units may be implemented in a form of software invoked by a processing element, and some units may be implemented in a form of hardware. For example, each unit may be an independently disposed processing element, or may be integrated into a chip of the apparatuses for implementation. Alternatively, each unit may be stored in a memory in a form of a program to be invoked by a processing element of the apparatuses to perform a function of the unit. In addition, all or some of the units may be integrated together, or may be implemented independently. The processing element herein may also be referred to as a processor, and may be an integrated circuit having a signal processing capability. In an implementation process, the steps in the foregoing method or the foregoing units may be implemented by using a hardware integrated logic circuit of the processing element, or may be implemented in a form of software invoked by the processing element.

For example, a unit in any one of the foregoing apparatuses may be one or more integrated circuits configured to implement the foregoing method, for example, one or more application-specific integrated circuits (ASIC), one or more microprocessors such as a digital signal processor (DSP), one or more field programmable gate arrays (FPGA), or a combination of at least two of the integrated circuits. For another example, when a unit in the apparatuses is implemented in a form of a program invoked by the processing element, the processing element may be a general-purpose processor, for example, a central processing unit (CPU), or another processor that can invoke the program. For still another example, the units may be integrated and implemented in a form of a system-on-a-chip (SOC).

The foregoing receiving unit is an interface circuit of the apparatus, and is configured to receive a signal from another apparatus. For example, when the apparatus is implemented in a form of a chip, the receiving unit is an interface circuit that is of the chip and that is configured to receive a signal from another chip or apparatus. The foregoing sending unit is an interface circuit of the apparatus, and is configured to send a signal to another apparatus. For example, when the apparatus is implemented in a form of a chip, the sending unit is an interface circuit that is of the chip and that is configured to send a signal to another chip or apparatus.

Figure 9:
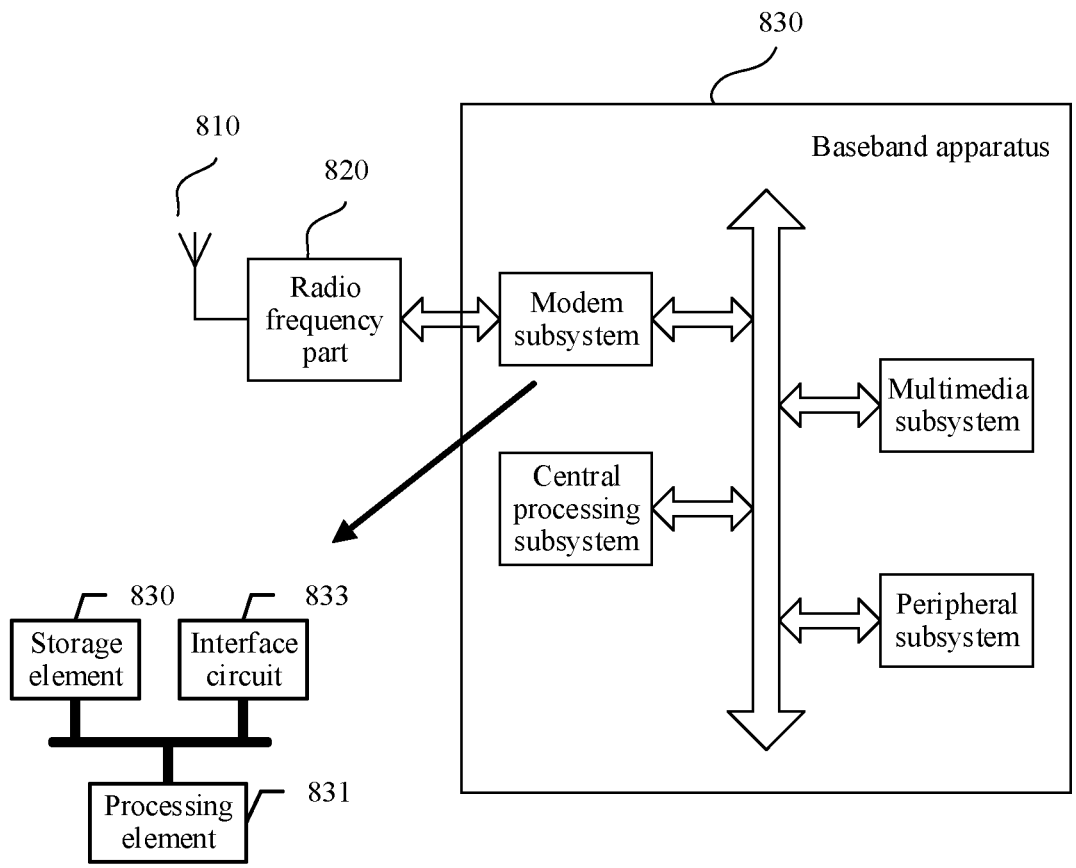
FIG. 9 is a schematic diagram of a structure of a terminal device according to an embodiment of this application.

FIG. 9 is a schematic diagram of a structure of a terminal device according to an embodiment of this application. The terminal device may be the terminal device in the foregoing embodiments and is configured to implement operations of the terminal device in the foregoing embodiments. As shown in FIG. 9, the terminal device includes an antenna 810, a radio frequency part 820, and a signal processing part 830. The antenna 810 is connected to the radio frequency part 820. In a downlink direction, the radio frequency part 820 receives, through the antenna 810, information sent by a network device, and sends, to the signal processing part 830 for processing, the information sent by the network device. In an uplink direction, the signal processing part 830 processes information from the terminal device, and sends the information to the radio frequency part 820. The radio frequency part 820 processes the information from the terminal device, and then sends processed information to the network device through the antenna 810.

The signal processing part 830 may include a modem subsystem, configured to process data at each communications protocol layer. The signal processing part 830 may further include a central processing subsystem, configured to process an operating system and an application layer that are of the terminal device. In addition, the signal processing part 830 may further include another subsystem, for example, a multimedia subsystem, or a peripheral subsystem. The multimedia subsystem is configured to control a camera or a screen display of the terminal device. The peripheral subsystem is configured to connect to another device. The modem subsystem may be a separately disposed chip. Optionally, the foregoing apparatus used for the terminal device may be located in the modem subsystem.

The modem subsystem may include one or more processing elements 831, for example, include one main control CPU and another integrated circuit. In addition, the modem subsystem may further include a storage element 830 and an interface circuit 833. The storage element 830 is configured to store data and a program. However, a program used to perform the methods performed by the terminal device in the foregoing methods may not be stored in the storage element 830, but is stored in a memory outside the modem subsystem, and is loaded and used by the modem subsystem when to be used. The interface circuit 833 is configured to communicate with another subsystem. The foregoing apparatus used for the terminal device may be located in the modem subsystem, and the modem subsystem may be implemented by a chip. The chip includes at least one processing element and an interface circuit. The processing element is configured to perform the steps of any one of the methods performed by the terminal device. The interface circuit is configured to communicate with another apparatus. In an implementation, units of the terminal device that implement the steps of the foregoing methods may be implemented by a program invoked by a processing element. For example, the apparatus used for the terminal device includes a processing element and a storage element. The processing element invokes a program stored in the storage element, to perform the methods performed by the terminal device in the foregoing method embodiment. The storage element may be a storage element located on a same chip as the processing element, namely, an on-chip storage element.

In another implementation, a program used to perform the methods performed by the terminal device in the foregoing methods may be in a storage element located on a different chip from the processing element, namely, an off-chip storage element. In this case, the processing element invokes or loads the program from the off-chip storage element to the on-chip storage element, to invoke and perform the methods performed by the terminal device in the foregoing method embodiments.

In still another implementation, units of the terminal device that implement the steps in the foregoing methods may be configured as one or more processing elements. These processing elements are disposed in the modem subsystem. The processing element herein may be an integrated circuit, for example, one or more ASICs, one or more DSPs, one or more FPGAs, or a combination of these types of integrated circuits. These integrated circuits may be integrated together to form a chip.

Units of the terminal device that implement the steps in the foregoing methods may be integrated together, and implemented in a form of a system-on-a-chip (SOC). The SOC chip is configured to implement the foregoing methods. At least one processing element and storage element may be integrated into the chip, and the processing element invokes a program stored in the storage element to implement the foregoing methods performed by the terminal device. Alternatively, at least one integrated circuit may be integrated into the chip, to implement the foregoing methods performed by the terminal device. Alternatively, with reference to the foregoing implementations, functions of some units may be implemented by a program invoked by the processing element, and functions of some units may be implemented by the integrated circuit.

It can be learned that the foregoing apparatus used for the terminal may include at least one processing element and interface circuit. The at least one processing element is configured to perform any one of the methods that are provided in the foregoing method embodiments and performed by the terminal device. The processing element may perform some or all steps performed by the terminal device, in a first manner, to be specific, by invoking the program stored in the storage element; or may perform some or all steps performed by the terminal device, in a second manner, to be specific, by using a hardware integrated logic circuit in the processing element in combination with an instruction; or may certainly perform, by combining the first manner and the second manner, some or all steps performed by the terminal device.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of the integrated circuits.

The storage element may be one memory, or may be a general term of a plurality of storage elements.

Figure 10:
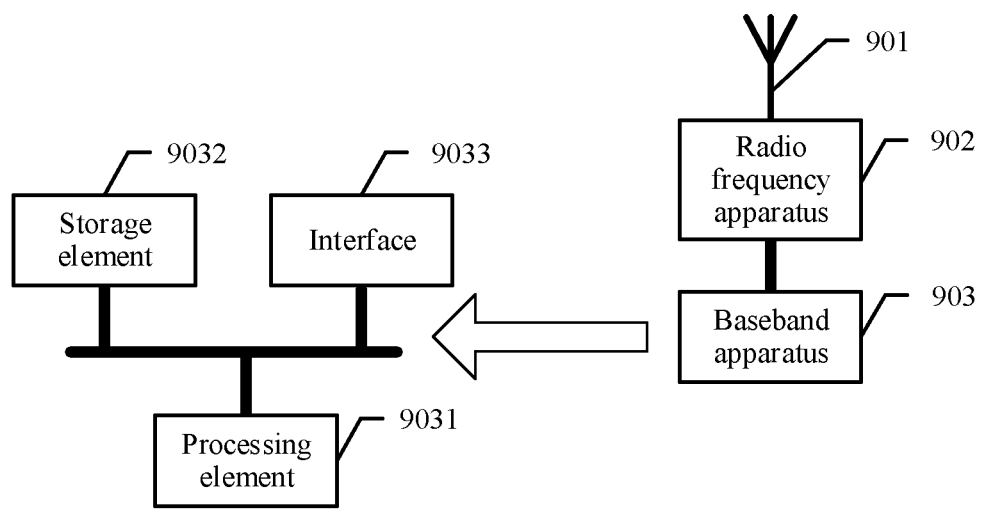
FIG. 10 is a schematic diagram of a structure of a network device according to an embodiment of this application.

FIG. 10 is a schematic diagram of a structure of a network device according to an embodiment of this application. FIG. 10 is a schematic diagram of a structure of a network device according to an embodiment of this application. The network device is configured to implement operations of the network device in the foregoing embodiments. As shown in FIG. 10, the network device includes an antenna 901, a radio frequency apparatus 902, and a baseband apparatus 903. The antenna 901 is connected to the radio frequency apparatus 902. In an uplink direction, the radio frequency apparatus 902 receives, by using the antenna 901, information sent by a terminal, and sends, to the baseband apparatus 903 for processing, the information sent by the terminal. In a downlink direction, the baseband apparatus 903 processes the information from the terminal, and sends the information to the radio frequency apparatus 902. The radio frequency apparatus 902 processes the information from the terminal, and then sends processed information to the terminal by using the antenna 901.

The baseband apparatus 903 may include one or more processing elements 9031, for example, include one main control CPU and another integrated circuit. In addition, the baseband apparatus 903 may further include a storage element 9032 and an interface 9033. The storage element 9032 is configured to store a program and data. The interface 9033 is configured to exchange information with the radio frequency apparatus 902, and the interface is, for example, a common public radio interface (CPRI). The foregoing apparatus used for the network device may be located in the baseband apparatus 903. For example, the foregoing apparatus used for the network device may be a chip on the baseband apparatus 903. The chip includes at least one processing element and interface circuit. The processing element is configured to perform the steps of any one of the methods performed by the network device. The interface circuit is configured to communicate with another apparatus. In an implementation, units of the network device that implement the steps in the foregoing methods may be implemented by a program invoked by a processing element. For example, the apparatus used for the network device includes a processing element and a storage element. The processing element invokes a program stored in the storage element, to perform the methods performed by the network device in the foregoing method embodiments. The storage element may be a storage element located on a same chip as the processing element, namely, an on-chip storage element, or may be a storage element located on a different chip from the processing element, namely, an off-chip storage element.

In another implementation, units of the network device that implement the steps in the foregoing methods may be configured as one or more processing elements. These processing elements are disposed in the baseband apparatus. The processing element herein may be an integrated circuit, for example, one or more ASICs, one or more DSPs, one or more FPGAs, or a combination of these types of integrated circuits. These integrated circuits may be integrated together to form a chip.

Units of the network device that implement the steps in the foregoing methods may be integrated together, and implemented in a form of a system-on-a-chip (SOC). For example, the baseband apparatus includes the SOC chip, configured to implement the foregoing methods. At least one processing element and storage element may be integrated into the chip, and the processing element invokes a program stored in the storage element to implement the foregoing methods performed by the network device. Alternatively, at least one integrated circuit may be integrated into the chip, to implement the foregoing methods performed by the network device. Alternatively, with reference to the foregoing implementations, functions of some units may be implemented by a program invoked by the processing element, and functions of some units may be implemented by the integrated circuit.

It can be learned that the foregoing apparatus used for the network device may include at least one processing element and interface circuit. The at least one processing element is configured to perform any one of the methods that are provided in the foregoing method embodiments and performed by the network device. The processing element may perform some or all steps performed by the network device, in a first manner, to be specific, by invoking the program stored in the storage element; or may perform some or all steps performed by the network device, in a second manner, to be specific, by using a hardware integrated logic circuit in the processing element in combination with an instruction; or may certainly perform, by combining the first manner and the second manner, some or all steps performed by the network device.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of the integrated circuits.

The storage element may be one memory, or may be a general term of a plurality of storage elements.

An embodiment of this application further provides a processing apparatus, including a processor and an interface. The processor is configured to perform the transmission method in the foregoing method embodiments.

It should be understood that the processing apparatus may be a chip. For example, the processing apparatus may be a field programmable gate array (FPGA), an ASIC, a SoC, a central processing unit (CPU), a network processor (NP), a digital signal processing circuit (DSP), a micro-controller (MCU), a programmable controller (PLD), or another integrated chip.

In an implementation process, steps in the foregoing methods can be implemented by using a hardware integrated logic circuit in the processor, or by using instructions in a form of software. The steps of the method disclosed with reference to the embodiments of this application may be directly performed by a hardware processor, or may be performed by using a combination of hardware in the processor and a software module. A software module may be located in a mature storage medium in the art, such as a random-access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor. To avoid repetition, details are not described herein again.

It should be noted that the processor in the embodiments of this application may be an integrated circuit chip, and has a signal processing capability. In an implementation process, steps in the foregoing method embodiments can be implemented by using a hardware integrated logic circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or a transistor logic device, or a discrete hardware component. It may implement or perform the methods, the steps, and logical block diagrams that are disclosed in the embodiments of this application. The general-purpose processor may be a microprocessor, or the processor may be any conventional processor, or the like. Steps of the methods disclosed with reference to the embodiments of this application may be directly executed and completed by a hardware decoding processor, or may be executed and completed by using a combination of hardware and software modules in a decoding processor. A software module may be located in a mature storage medium in the art, such as a random-access memory, a flash memory, a read-only memory, a programmable read-only memory, an electrically erasable programmable memory, or a register. The storage medium is located in the memory, and a processor reads information in the memory and completes the steps in the foregoing methods in combination with hardware of the processor.

It may be understood that the memory in the embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random-access memory (RAM), used as an external cache. Through example but not limitative description, RAMs in many forms may be used, for example, a static random-access memory (SRAM), a dynamic random-access memory (DRAM), a synchronous dynamic random-access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM). It should be noted that the memory of the systems and methods described in this specification includes but is not limited to these and any memory of another appropriate type.

According to the method provided in the embodiments of this application, this application further provides a computer program product. The computer program product includes computer program code. When the computer program code is run on a computer, the computer is enabled to perform the method in any one of the embodiments shown in FIG. 4 to FIG. 7.

According to the method provided in the embodiments of this application, this application further provides a computer-readable medium. The computer-readable medium stores program code. When the program code is run on a computer, the computer is enabled to perform the method in any one of the embodiments shown in FIG. 4 to FIG. 7.

According to the method provided in the embodiments of this application, this application further provides a system. The system includes the foregoing one or more terminal devices and the foregoing one or more network devices.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid-state drive (SSD)), or the like.

The network device and the terminal device in the foregoing apparatus embodiments totally correspond to the network device and the terminal device in the method embodiments. A corresponding module or unit performs a corresponding step. For example, a communications unit (a transceiver) performs a receiving step or a sending step in the method embodiments, and a processing unit (a processor) may perform another step other than the sending step and the receiving step. For a function of a specific unit, refer to the corresponding method embodiments. There may be one or more processors.

Terms such as "component", "module", and "system" used in this specification are used to indicate computer-related entities, hardware, firmware, combinations of hardware and software, software, or software being executed. For example, a component may be, but is not limited to, a process that runs on a processor, a processor, an object, an executable file, a thread of execution, a program, and/or a computer. As shown in figures, both a computing device and an application that runs on a computing device may be components. One or more components may reside within a process and/or a thread of execution, and a component may be located on one computer and/or distributed between two or more computers. In addition, these components may be executed from various computer-readable media that store various data structures. For example, the components may communicate by using a local and/or remote process and according to, for example, a signal having one or more data packets (for example, data from two components interacting with another component in a local system, a distributed system, and/or across a network such as the internet interacting with other systems by using the signal).

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random-access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A transmission method, comprising:
    receiving first downlink control information, wherein the first downlink control information indicates or activates a downlink transmission resource;
    receiving downlink data on the downlink transmission resource;
    receiving second downlink control information in a target time period within a discontinuous reception (DRX) activation time, wherein the second downlink control information indicates an uplink transmission resource that is used to transmit feedback information for the downlink data, and a start time of the target time period within the DRX activation time is determined based on an end location of the downlink data; and
    sending the feedback information on the uplink transmission resource.

2. The method according to claim 1, wherein an end time of the target time period is a time at which the second downlink control information is received, or an end time of the target time period is configured by the network device.

3. The method according to claim 1, wherein the first downlink control information comprises time range indication information, the time range indication information is used to indicate a time range, and the time range is a time range in which a terminal device expects to receive the second downlink control information.

4. The method according to claim 1, wherein the second downlink control information further comprises at least one of the following:
    identifier information of the terminal device;
    identifier information of a first serving cell, wherein the first serving cell is a cell corresponding to the downlink transmission resource on which the first downlink control information is carried;
    identifier information of a second serving cell, wherein the uplink transmission resource is located in the second serving cell;
    identifier information of a hybrid automatic repeat request (HARQ) process, wherein the HARQ process is a HARQ process corresponding to the second downlink control information;
    identifier information of an uplink bandwidth part (BWP), wherein the BWP is a BWP to which the uplink transmission resource belongs; and
    identifier information of a subband, wherein the subband is a subband to which the uplink transmission resource belongs.

5. A transmission method, comprising:
    sending first downlink control information, wherein the first downlink control information is used to indicate or activate a downlink transmission resource;
    sending downlink data on the downlink transmission resource;
    sending second downlink control information in a target time period within a discontinuous reception (DRX) activation time, wherein the second downlink control information is used to indicate an uplink transmission resource, and the uplink transmission resource is used to transmit feedback information for the downlink data; and
    receiving the feedback information on the uplink transmission resource.

6. The method according to claim 5, wherein the first downlink control information comprises time range indication information, the time range indication information is used to indicate a time range, and the time range is a time range in which a terminal device expects to receive the second downlink control information.

7. The method according to claim 5, wherein the second downlink control information is used to indicate that a type of a channel access process of the terminal device is a first type, or the second downlink control information is used to indicate the terminal device not to perform a channel access process.

8. The method according to claim 5, wherein the downlink transmission resource and the uplink transmission resource belong to different channel occupancy time (COT) in time domain.

9. An apparatus, comprising:
    at least one processor; and
    a memory storing instructions for execution by the at least one processor when executed, the instructions cause the apparatus to receive first downlink control information, wherein the first downlink control information is used to indicate or activate a downlink transmission resource, receive downlink data on the downlink transmission resource, receive second downlink control information, wherein the second downlink control information is used to indicate an uplink transmission resource, and the uplink transmission resource is used to transmit feedback information for the downlink data, and sending the feedback information on the uplink transmission resource, wherein the instructions to receive second downlink control information comprises instructions to monitor a downlink control channel in a target time period within a discontinuous reception (DRX) activation time to obtain the second downlink control information, wherein a start time of the target time period with in the DRX activation time is determined based on an end location of the downlink data.

10. The apparatus according to claim 9, wherein an end time of the target time period is a time at which the second downlink control information is received, or an end time of the target time period is configured by the network device.

11. The apparatus according to claim 9, wherein the first downlink control information comprises time range indication information, the time range indication information is used to indicate a time range, and the time range is a time range in which a terminal device expects to receive the second downlink control information.

12. The apparatus according to claim 9, wherein the second downlink control information further comprises at least one of the following:
    identifier information of the terminal device;
    identifier information of a first serving cell, wherein the first serving cell is a cell corresponding to the downlink transmission resource on which the first downlink control information is carried;
    identifier information of a second serving cell, wherein the uplink transmission resource is located in the second serving cell;
    identifier information of a hybrid automatic repeat request (HARQ) process, wherein the HARQ process is a HARQ process corresponding to the second downlink control information;
    identifier information of an uplink bandwidth part (BWP), wherein the BWP is a BWP to which the uplink transmission resource belongs; and identifier information of a subband, wherein the subband is a subband to which the uplink transmission resource belongs.

13. An apparatus, comprising:
at least one processor; and
a memory storing instructions for execution by the at least one processor, the instructions, when executed, cause the apparatus to send first downlink control information, wherein the first downlink control information is used to indicate or activate a downlink transmission resource, send downlink data on the downlink transmission resource, send second downlink control information in a target time period within a discontinuous reception (DRX) activation time, wherein the second downlink control information is used to indicate an uplink transmission resource, and the uplink transmission resource is used to transmit feedback information for the downlink data, and receive the feedback information on the uplink transmission resource, a start time of the target time period within the DRX active time is determined based on an end location of the downlink data.

14. The apparatus according to claim 13, wherein the first downlink control information comprises time range indication information, the time range indication information is used to indicate a time range, and the time range is a time range in which a terminal device expects to receive the second downlink control information.

15. The apparatus according to claim 13, wherein the second downlink control information is used to indicate that a type of a channel access process of the terminal device is a first type, or the second downlink control information is used to indicate the terminal device not to perform a channel access process.

16. The apparatus according to claim 13, wherein the downlink transmission resource and the uplink transmission resource belong to different channel occupancy time (COT) in time domain.

17. A transmission method, comprising:
receiving first downlink control information;
receiving downlink data on the downlink transmission resource;
receiving second downlink control information in a target time period within a discontinuous reception (DRX) activation time, wherein the second downlink control information indicates an uplink transmission resource, the uplink transmission resource is used to transmit feedback information for the downlink data, a start time of the target time period within the DRX active time is determined on an end location of the downlink data; and
sending the feedback information on the uplink transmission resource.

18. The method of claim 17, wherein the first downlink control information indicates or activates a downlink transmission resource.

19. The method of claim 17, wherein the start time of the target time period is determined based on an end location of the first downlink control information or an end location of the downlink data.

20. The method according to claim 17, wherein an end time of the target time period is a time at which the second downlink control information is received, or an end time of the target time period is configured by the network device.

\* \* \* \* \*